United States Patent
Motomura et al.

(10) Patent No.: US 9,947,089 B2
(45) Date of Patent: Apr. 17, 2018

(54) DIGITAL SPECIMEN MANUFACTURING DEVICE, DIGITAL SPECIMEN MANUFACTURING METHOD, AND DIGITAL SPECIMEN MANUFACTURING SERVER

(71) Applicant: Panasonic Corporation, Osaka (JP)

(72) Inventors: Hideto Motomura, Kyoto (JP); Yoshikuni Sato, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 667 days.

(21) Appl. No.: 14/062,008

(22) Filed: Oct. 24, 2013

(65) Prior Publication Data
US 2014/0049628 A1 Feb. 20, 2014

Related U.S. Application Data

(63) Continuation of application No. PCT/JP2012/007290, filed on Nov. 14, 2012.

(30) Foreign Application Priority Data

Dec. 8, 2011 (JP) .................................. 2011-269368

(51) Int. Cl.
*H04N 9/47* (2006.01)
*H04N 7/18* (2006.01)
(Continued)

(52) U.S. Cl.
CPC .......... *G06T 7/0012* (2013.01); *G02B 21/367* (2013.01); *G06T 3/40* (2013.01);
(Continued)

(58) Field of Classification Search
CPC .. A61B 19/5212; A61B 5/0077; G01N 21/00; G01N 1/00; G02B 21/00
(Continued)

(56) References Cited

U.S. PATENT DOCUMENTS 7,929,738 B2   4/2011  Shirota et al.
7,991,837 B1 *  8/2011  Tahan ................... G06F 3/0481
                                                        348/240.3
(Continued)

FOREIGN PATENT DOCUMENTS

JP      2007-17930      1/2007
JP      2008-304541    12/2008
(Continued)

OTHER PUBLICATIONS

International Search Report issued in International Application No. PCT/JP2012/007290 dated Jan. 25, 2013.
(Continued)

*Primary Examiner* — Mehrdad Dastouri
*Assistant Examiner* — Kristin Dobbs
(74) *Attorney, Agent, or Firm* — Wenderoth, Lind & Ponack, L.L.P.

(57) ABSTRACT

A digital specimen manufacturing device comprises: a reduction processing unit which generates a reduced image by reducing a high resolution image of a first magnification into a second magnification image; an operation instruction unit which instructs the imaging unit to update the second magnification and recapture the low resolution image when information indicates the difference between the reduced image and the low resolution image is not within the allowable error range; and an image processing unit which obtains a third magnification, and outputs an image of the digital specimen by reducing the high resolution image into an image of the third magnification which an image magnification greater than the updated second magnification and smaller than the first magnification.

9 Claims, 14 Drawing Sheets

(51) Int. Cl.
  *G06T 7/00* (2017.01)
  *G06T 3/40* (2006.01)
  *G02B 21/36* (2006.01)
  *H04N 5/232* (2006.01)

(52) U.S. Cl.
  CPC ....... *G06T 7/0004* (2013.01); *H04N 5/23235* (2013.01); *H04N 5/23296* (2013.01); *G06T 2207/10056* (2013.01); *G06T 2207/20016* (2013.01); *G06T 2207/30024* (2013.01); *G06T 2207/30168* (2013.01)

(58) Field of Classification Search
  USPC .......................................................... 348/77
  See application file for complete search history.

(56) References Cited

U.S. PATENT DOCUMENTS

2001/0050999 A1\* 12/2001 Bacus ................ G01N 15/1475
                                                                      382/128
2003/0138164 A1\* 7/2003 Satou ...................... G06T 5/002
                                                                      382/275
2007/0081231 A1 4/2007 Shirota et al.
2007/0286517 A1\* 12/2007 Paik ................... H04N 5/23212
                                                                      382/255
2011/0129135 A1 6/2011 Mizutani et al.
2011/0131535 A1 6/2011 Tagami et al.

FOREIGN PATENT DOCUMENTS

| JP | 2009-223164 | 10/2009 |
| JP | 2011-112523 | 6/2011 |
| JP | 2011-117991 | 6/2011 |

OTHER PUBLICATIONS

Byori Rinshou Saibou Bumon Sisutemu no Hyoujunka Katsudou (Standardization Activity for Anatomic Pathology Information System), Japanese Association of Healthcare Information Systems Industry, pp. 20-21, Feb. 2011 (with partial English translation).

\* cited by examiner

DIGITAL SPECIMEN MANUFACTURING DEVICE, DIGITAL SPECIMEN MANUFACTURING METHOD, AND DIGITAL SPECIMEN MANUFACTURING SERVER

CROSS REFERENCE TO RELATED APPLICATIONS

This is a continuation application of PCT International Application No. PCT/JP2012/007290 filed on Nov. 14, 2012, designating the United States of America, which is based on and claims priority of Japanese Patent Application No. 2011-269368 filed on Dec. 8, 2011. The entire disclosures of the above-identified applications, including the specifications, drawings and claims are incorporated herein by reference in their entirety.

FIELD

One or more exemplary embodiments disclosed herein relate to a digital specimen manufacturing device, a digital specimen manufacturing method, and a digital specimen manufacturing server for manufacturing a digital specimen used in medical diagnosis and treatment.

BACKGROUND

Conventionally, techniques for imaging specimens have been proposed for manufacturing digital specimens used in medical diagnosis and treatment (e.g., refer to Patent Literature 1 and Non Patent Literature 1).

CITATION LIST

Patent Literature

Patent Literature 1: Japanese Unexamined Patent Application Publication No. 2009-223164

Non Patent Literature

Non Patent Literature 1: Byori Rinshou Saibou Bumon Sisutemu no Hyoujunka Katsudou (Standardization Activity for Anatomic Pathology Information System), Japanese Association of Healthcare Information Systems Industry, pp. 20-21, 2011

SUMMARY

Technical Problem

However, the above described conventional techniques have a problem that when digital specimens are manufactured by reducing or enlarging images other than magnification used at the time of image capturing, it is not possible to maintain the image quality at a certain standard.

One non-limiting and exemplary embodiment provides a digital specimen manufacturing device, a digital specimen manufacturing server, and a digital specimen manufacturing method which make it possible to maintain the quality of image generated by image processing such as reduction from a captured image at a certain standard, and freely changing zoom and pan.

Solution to Problem

In one general aspect, the techniques disclosed here feature a digital specimen manufacturing device which manufactures a digital specimen to be used to diagnose a disease or a medical condition, using a low resolution image and a high resolution image which are captured images of a specimen captured by an imaging unit, the low resolution image and the high resolution image having different resolutions, the digital specimen manufacturing device comprising: a reduction processing unit configured to generate a reduced image of the high resolution image by reducing the high resolution image captured at a first magnification into an image of a second magnification which is an imaging magnification of the low resolution image; an operation instruction unit configured to obtain information indicating whether or not a difference between the reduced image and the low resolution image is within an allowable error range, and instruct the imaging unit to update the second magnification and recapture the low resolution image at the updated second magnification when the information indicates that the difference is not within the allowable error range, the updated second magnification having a value greater than the second magnification and smaller than the first magnification; and an image processing unit configured to obtain a third magnification, and outputting an image of the digital specimen by performing reduction processing to change the high resolution image into an image of the third magnification, the third magnification being an image magnification greater than the updated second magnification and smaller than the first magnification and being an imaging magnification of the digital specimen.

General and specific aspects disclosed above may be implemented using a server, a system, a method, an integrated circuit, a non-transitory recording medium such as a computer program or a computer-readable recording medium such as a CD-ROM, or any combination of apparatuses, servers, systems, methods, integrated circuits, computer programs, or recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A digital specimen manufacturing device according to one or more exemplary embodiments or features disclosed herein are capable of maintaining the quality of the image generated by image processing such as reduction from the captured image at a certain standard and of freely changing zoom and pan.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
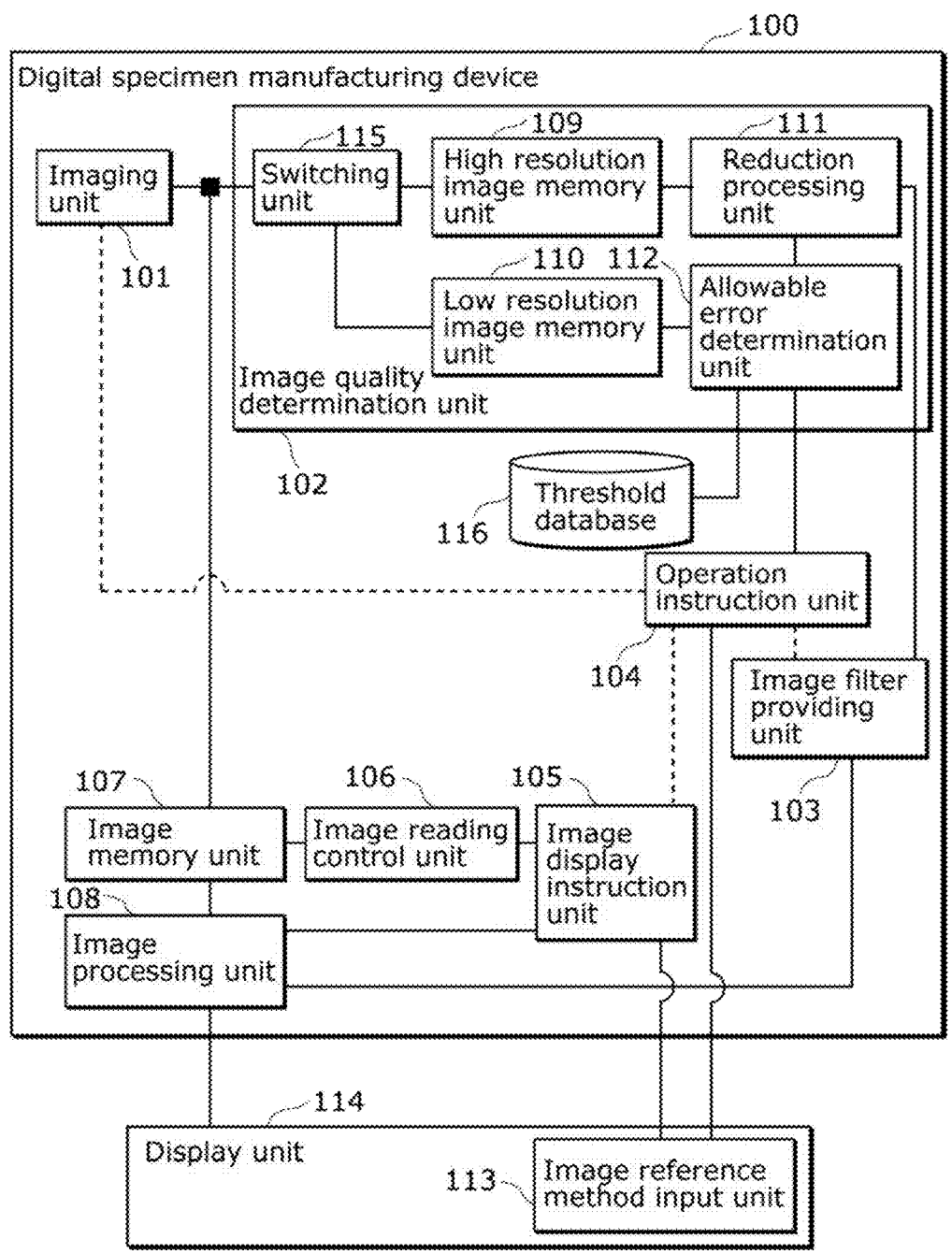
FIG. 1 is a block diagram showing a functional configuration of a digital specimen manufacturing device according to Embodiment 1.

Underlying Knowledge Forming Basis of the Present Disclosure

A medical service is divided into a diagnostic service and a treatment service.

The diagnostic service is aimed at determining the disease and a medical condition, and a treatment policy is determined according to the disease or the medical condition. The diagnostic service ranges from doctor's questions and palpation to a detailed test through diagnostic imaging when there is a suspicion of a disease. In the diagnostic imaging, the condition of the body is checked through a non-destructive test using radiation, ultrasonic waves, and the like. Moreover, the diagnostic service also focuses on observing the inner surface of organs through an endoscope. In order to determine the disease name and the medical condition, a sample is removed from an affected area, and a pathological diagnosis is performed for observing the condition on a cell-by-cell basis. The removed sample is sliced into thin sections and examined under a microscope, and then the specimen is manufactured.

In response to the diffusion of electronic health records and remote diagnosis, the specimen is imaged by a scanner and a digital camera, and then electronically recoded as digital image information. The digital specimen which is a digitized specimen is not only a hospital chart but also a past case for enhancing the medical technique that is used for observation from various points of views. Especially, since the digital specimen is a useful image for diagnostic imaging using radiation and ultrasonic waves, the digital specimen is medical information indispensable for enhancing the diagnostic imaging technique. As described above, the manufacturing of the digital specimen contributes to increasing efficiency and quality of medical care, and is an essential operation in the medical workflow.

A specific method for imaging a specimen comprises a microscope and a camera, as disclosed in Patent Literature 1. The specimen removed from the sample is stored in a glass slide and then observed under the microscope. The camera images the specimen as a color image through the microscope.

Since the focus on the observation of the specimen is changed according to types of diseases and conditions, a pathological diagnostician observes the specimen while changing an optical magnification of the microscope. The pathological diagnostician observes a whole pattern of the specimen at a low magnification, and observes a shape for each of the cell nuclei at a high magnification. Moreover, when part of the specimen is observed at a higher magnification, the whole of the specimen is observed by moving the glass slide. Therefore, the imaging of the specimen requires zoom and pan as a camera operation. In Patent Literature 1, zoom is changed by switching an objective lens, and pan is performed through controlling a transportation unit of the slide glass.

Since imaging is performed several times by changing zoom and pan, a plurality of the captured images are obtained. The captured images are unified as a specimen, and therefore they should be under a unified management. Therefore, as disclosed in the above described Non Patent Literature 1, if a low resolution image obtained by imaging at a low magnification and a high resolution image obtained by imaging at a high magnification are managed with a pyramid data structure, the magnifications and image positions can be uniformly managed. The resolution which allows the whole specimen to be recorded in an image is the lowest resolution, and the lowest resolution image captured at the lowest resolution is located at the top of the pyramid structure. The image captured at a higher magnification is an image with high resolution, and the image with high resolution is located at a lower part of the pyramid. The highest resolution image captured at the highest magnification is located at the base of the pyramid.

As described above, with the digital specimen, the specimen is digitized as a digital image and information of pathological diagnosis can be stored in electronic health records. Moreover, by sending the digital specimen to a remote area, a remote pathological diagnosis can be realized. Furthermore, the digital specimen can be referred to as the past case, and can be used for enhancing the technique for pathological diagnosis and diagnostic imaging.

However, the inventors have found that the conventional techniques cause the following problems. In other words, the conventional techniques have a problem that when digital samples are manufactured by reducing or enlarging images other than magnification used at the time of image capturing, it is not possible to maintain the image quality at a certain standard.

For example, when the highest resolution image located at the base of the pyramid structure is imaged at 32-fold magnification of the lowest resolution image located at the top of the pyramid, 1/32 reduction processing on the highest resolution image can generate the same resolution as that of the lowest resolution image. However, there is no guarantee that the lowest resolution image obtained from the reduction processing matches the lowest resolution image. If the image obtained by the reduction processing is different from the actually captured image, it is not possible to use the image obtained by the image reduction processing.

In one general aspect, the techniques disclosed here feature a digital sample manufacturing device which manufactures a digital specimen to be used to diagnose a disease or a medical condition, using a low resolution image and a high resolution image which are captured images of a specimen captured by an imaging unit, the low resolution image and the high resolution image having different resolutions, the digital specimen manufacturing device comprising: a reduction processing unit configured to generate a reduced image of the high resolution image by reducing the high resolution image captured at a first magnification into an image of a second magnification which is an imaging magnification of the low resolution image; an operation instruction unit configured to obtain information indicating whether or not a difference between the reduced image and the low resolution image is within an allowable error range, and instruct the imaging unit to update the second magnification and recapture the low resolution image at the updated second magnification when the information indicates that the difference is not within the allowable error range, the updated second magnification having a value greater than the second magnification and smaller than the first magnification; and an image processing unit configured to obtain a third magnification, and outputting an image of the digital specimen by performing reduction processing to change the high resolution image into an image of the third magnification, the third magnification being an image magnification greater than the updated second magnification and smaller than the first magnification and being an imaging magnification of the digital specimen.

With this, when a difference between the reduced image of the high resolution image and the low resolution image is not within an allowable error range, the digital specimen manufacturing device performs a recapture by enlarging the imaging magnification of the low resolution image, and performs a recapture until the difference between the recaptured low resolution image and the reduced image of the high resolution image is within the allowable error range, and then outputs an image a digital specimen with magnification that is greater than the imaging magnification of the recaptured low resolution image. With this, the digital specimen manufacturing device can maintain the image quality of the reduced image of the high resolution image at a certain standard when the digital specimen is manufactured. With this, the digital sample manufacturing device is capable of maintaining the quality of the image generated by image processing such as reduction from the captured image at a certain standard and of freely changing zoom and pan.

Moreover, for example, the digital specimen manufacturing device further comprises an allowable error determination unit configured to determine whether or not the difference between the reduced image and the low resolution image is within the allowable error range, wherein the operation instruction unit may be configured to obtain, according to a determination result by the allowable error determination unit, information indicating whether or not the difference is within the allowable error range, and to instruct the imaging unit to update the second magnification and recapture the low resolution image at the updated second magnification until information is obtained indicating that the difference is within the allowable error range, the updated second magnification having a value greater than a previously updated second magnification and smaller than the first magnification, the reduction processing unit may be configured to, every time the operation instruction unit updates the second magnification, generate the reduced image of the high resolution image by reducing the high resolution image into an image of the updated second magnification, and the allowable error determination unit may be configured to, every time the operation instruction unit instructs the imaging unit to update the second magnification and recapture the low resolution image at the updated second magnification, determine whether or not the difference between the low resolution image captured at the updated second magnification by the imaging unit and the reduced image generated by the reduction processing unit is within the allowable error range.

With this, the digital specimen manufacturing device determines whether or not the difference between the reduced image of the high resolution image and the low resolution image is within an allowable error range, and performs a recapture by enlarging the imaging magnification of the low resolution image until the difference is within the allowable error range. With this, the digital specimen manufacturing device can determine whether or not the difference is within the allowable error range without a doctor's diagnosis when the digital specimen is manufactured, and can maintain the image quality of the reduced image of the high resolution image at a certain standard. With this, the digital sample manufacturing device is capable of maintaining the quality of the image generated by image processing such as reduction from the captured image at a certain standard and of freely changing zoom and pan.

Moreover, for example, the allowable error determination unit may be configured to determine whether or not the difference is within the allowable error range by comparing (i) the difference between the reduced image and the low resolution image with (ii) a determination threshold, the operation instruction unit may be configured to obtain, by an input from outside, the information indicating whether or not the difference is within the allowable error range, and the allowable error determination unit may be configured to obtain, as the determination threshold, a difference between the reduced image and the low resolution image when the information obtained by the operation instruction unit indicates that the difference is within the allowable error range.

With this, the digital specimen manufacturing device obtains, from an input from the outside, information indicating whether or not the difference between the reduced image of the high resolution image and the low resolution image is within the allowable error range, and obtains, as a determination threshold, the difference between the reduced image and the low resolution image when the information indicates that the difference is within the allowable error range. Then, the digital specimen manufacturing device determines, using the determination threshold, whether or not the difference between the reduced image of the high resolution image and the low resolution image is within the allowable error range. With this, the digital specimen manufacturing device can obtain the determination threshold and make a determination when a doctor determines whether or not the difference between the reduced image of the high resolution image and the low resolution image within the allowable error range and provides an instruction to the digital specimen manufacturing device.

Moreover, for example, the allowable error determination unit may be configured to calculate a peak signal-to-noise ratio (PSNR) as a difference between the reduced image and the low resolution image, and determine whether or not the difference is within an allowable error range by comparing the calculated PSNR with a determination threshold.

With this, the digital specimen manufacturing device calculates PSNR as a difference between the reduced image of the high resolution image and the low resolution image and determines whether or not the difference is within the allowable error range. In other words, the digital specimen manufacturing device can determine whether or not the difference is within the allowable error range, by digitizing the image quality.

Moreover, for example, the reduction processing unit may be configured to generate the reduced image by reducing, using a band limiting filter, the high resolution image into the image of the second magnification, and the digital specimen manufacturing device may further comprise an image filter providing unit configured to provide the image processing unit with the band limiting filter used by the reduction processing unit when the operation instruction unit obtains information indicating that the difference is within the allowable error range, wherein the image processing unit may be configured to output an image of the digital specimen by performing reduction processing on the high resolution image using the provided band limiting filter.

With this, when the difference between the reduced image of the high resolution image and the low resolution image is within the allowable error range, the digital specimen manufacturing device outputs an image of the digital specimen by using the band limiting filter used for generating the reduced image and by performing reduction processing on the high resolution image. With this, the digital specimen manufacturing device can generate the reduced image having the same image quality as that of the actually captured image, and can output an image of the digital specimen.

Moreover, for example, the digital specimen manufacturing device may further include a color correction unit configured to correct a difference in color feature between the reduced image and the low resolution image.

With this, the digital specimen manufacturing device corrects the difference in color feature between the reduced image of the high resolution image and the low resolution image. With this, the digital specimen manufacturing device can correct the difference in color feature between when the low resolution image is captured and when the high resolution image is captured, and equalize the image quality of the image generated by image processing with the image quality of the actually captured image.

Moreover, for example, the color correction unit may be configured to generate color correction information for correcting the difference in color feature, from a color feature of the imaging unit at a time of capturing the low resolution image and a color feature of the imaging unit at a time of capturing the high resolution image.

With this, the digital specimen manufacturing device generates color correction information for correcting the difference in color feature between when the low resolution image is captured and when the high resolution image is captured. With this, the digital specimen manufacturing device can correct the difference in color feature between when the low resolution image is captured and when the high resolution image is captured, and equalize the image quality of the image generated by image processing with the image quality of the actually captured image.

Hereinafter, certain exemplary embodiments are described in greater detail with reference to the accompanying Drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Embodiment 1

The present embodiment will describe a digital specimen manufacturing device which can freely switch between zoom and pan in image processing after performing reduction processing on the captured image, and can maintain the image quality at a certain standard.

FIG. 1 is a block diagram showing a functional configuration of a digital sample manufacturing device 100 according to Embodiment 1.

As shown in FIG. 1, the digital specimen manufacturing device 100 manufactures a digital specimen used in determining the disease name or diagnosing the medical condition, using a low resolution image and a high resolution image which are captured images of the specimen that have different resolutions and are captured by an imaging unit 101.

Specifically, the digital specimen manufacturing device 100 includes the imaging unit 101, an image quality determination unit 102, an image filter providing unit 103, an operation instruction 104, an image display instruction unit 105, an image reading control unit 106, an image memory unit 107, and an image processing unit 108. The digital specimen manufacturing device 100 manufactures a digital image by imaging the specimen, and provides a corresponding digital image to a display unit 114 according to a reference method of the digital specimen.

Figure 2:
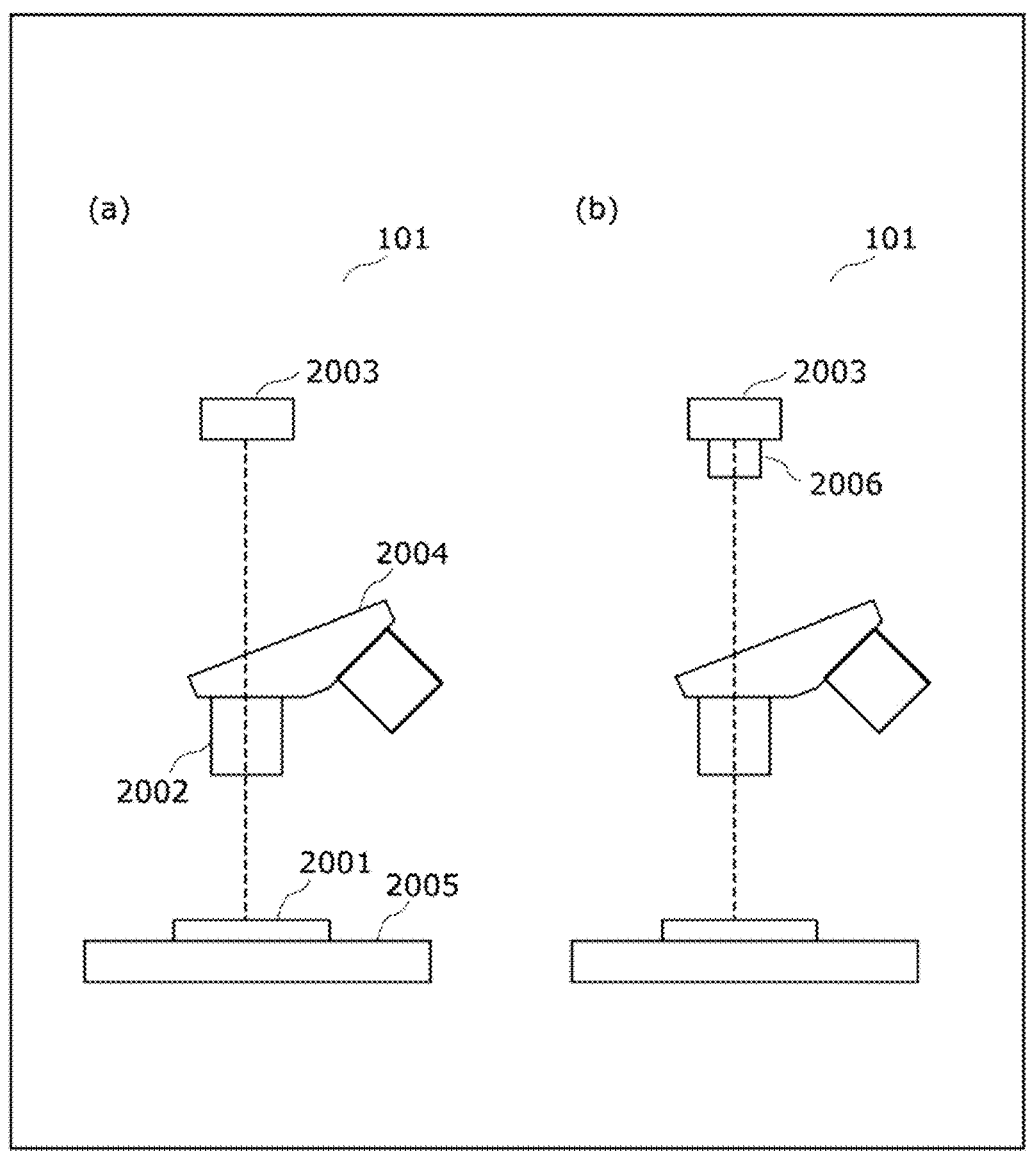
FIG. 2 is a diagram showing a configuration of an imaging unit according to Embodiment 1.

First, with reference to FIG. 2, the imaging unit 101 will be described. FIG. 2 is a diagram showing a configuration of the imaging unit 101 according to Embodiment 1.

As shown in (a) in FIG. 2, the imaging unit 101 images a specimen 2001 that is an object through an objective lens 2002 using a camera 2003. Digital images having different resolutions can be captured by rotating a revolver 2004 which includes objective lenses with different optical magnifications. Moreover, by controlling the position of a stage 2005, a position relationship between the specimen 2001 and the camera 2003 can be changed and pan can be controlled.

Moreover, as shown in (b) in FIG. 2, when a multifocal lens 2006 which can continuously change a focal length is provided ahead of the camera 2003, it is possible to set an optical magnification other than that of the objective lens and continuously change the magnification. Parameters related to imaging (hereinafter referred to as imaging parameters) such as the magnification of the objective lens used in imaging, the location of the stage 2005, the size of an imaging element of the camera 2003, and illumination are automatically recorded by the imaging unit 101, and the parameters are managed along with the image data. The imaging parameters are used in image processing to be described later.

It should be noted that one or more exemplary embodiments or features disclosed herein do not limit an imaging method. The configurations shown in (a) in FIG. 2 and (b) in FIG. 2 are mere examples. For example, a method for using the revolver 2004 for an exchange of the objective lens 2002 is one example. It is possible to change an optical magnification with only the multifocal lens 2006. Moreover, one or more exemplary embodiments or features disclosed herein do not limit the conditions related to imaging such as illumination.

Going back to FIG. 1, the image quality determination unit 102 includes a switching unit 115, a high resolution image memory unit 109, a low resolution image memory unit 110, a reduction processing unit 111, and an allowable error determination unit 112. The image quality determination unit 102 determines the image quality of the digital specimen generated by image processing.

Figure 3:
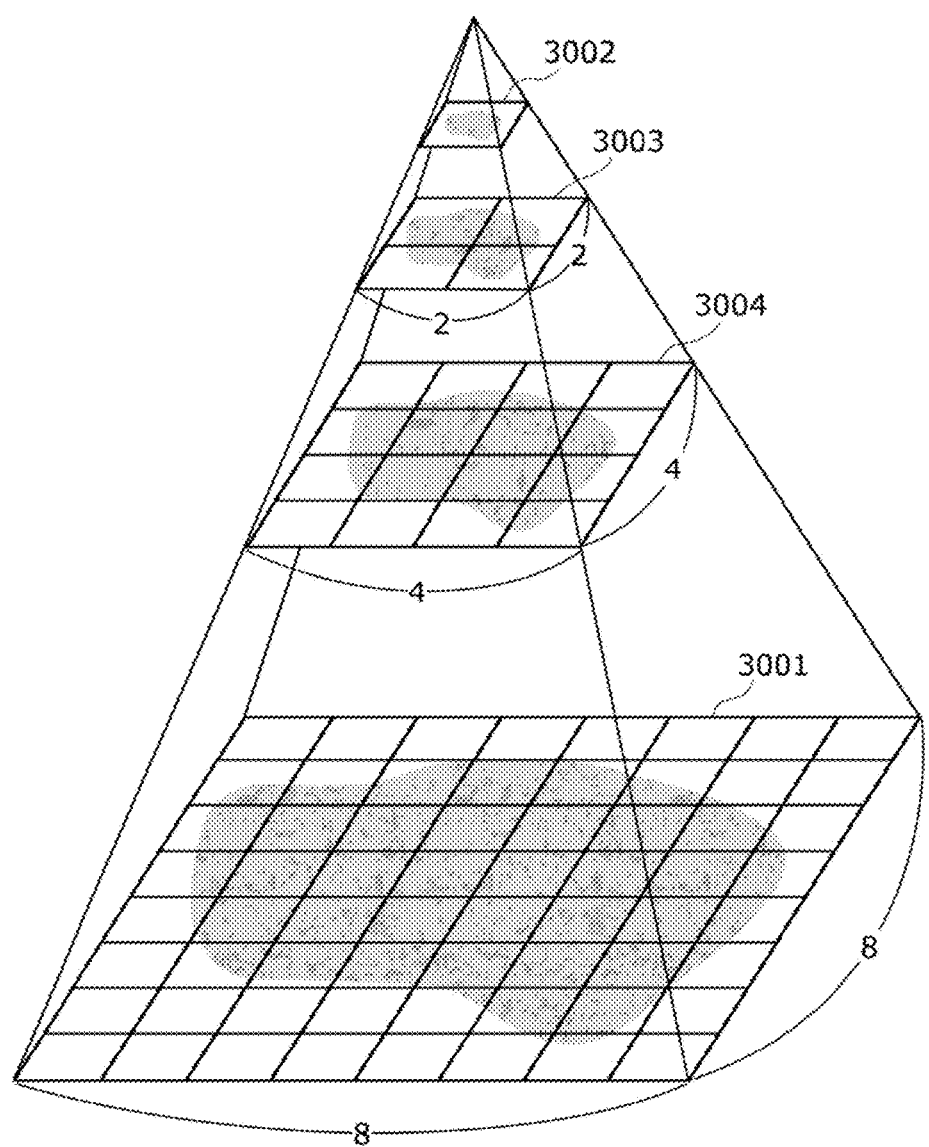
FIG. 3 is a diagram describing an image quality determination method performed by an image quality determination unit according to Embodiment 1.
Figure 4:
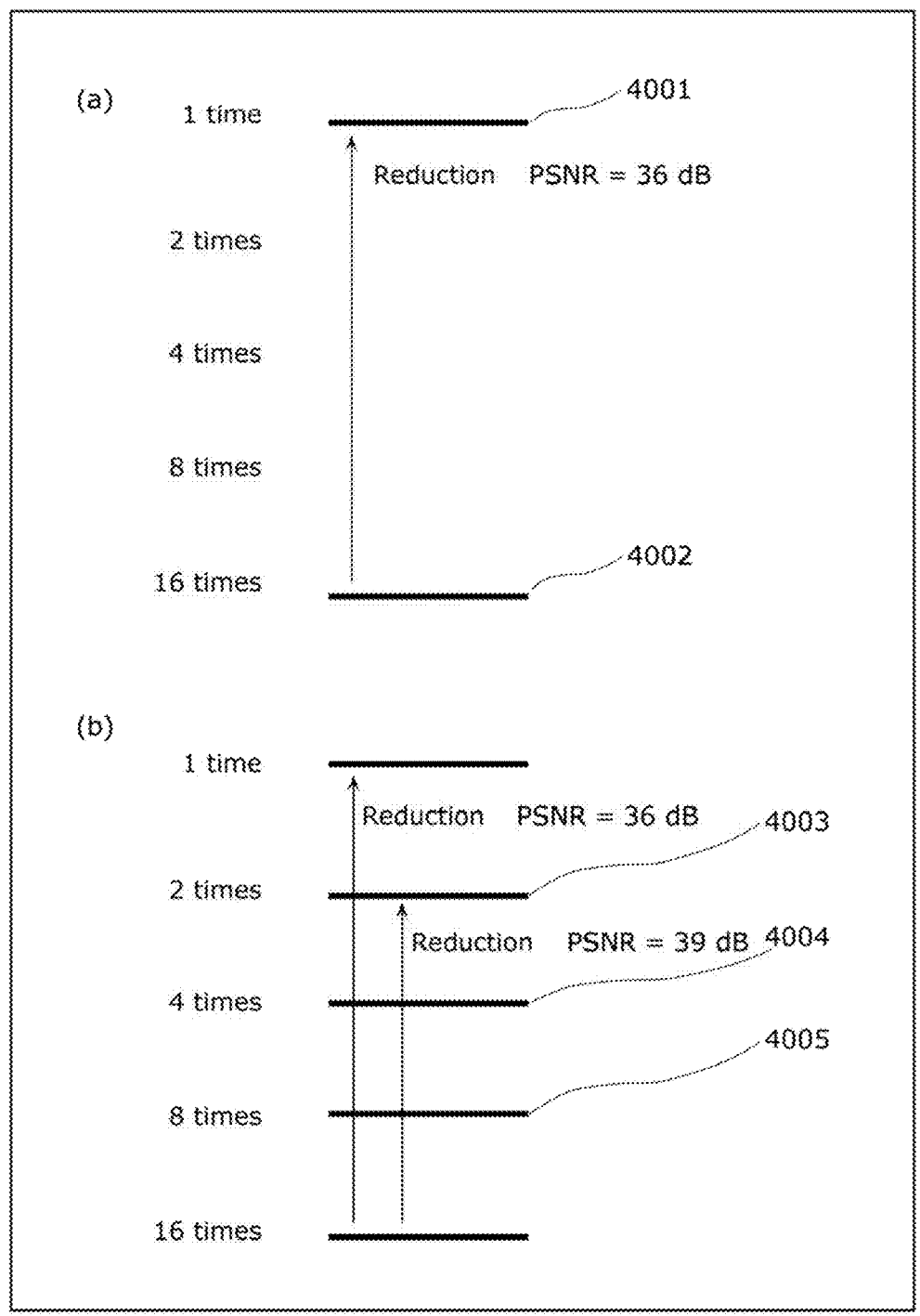
FIG. 4 is a diagram describing a process of obtaining a determination threshold by an allowable error determination unit according to Embodiment 1.

FIG. 3 is a diagram describing an image quality determination method performed by the image quality determination unit 102 according to Embodiment 1. Moreover, FIG. 4 is a diagram describing a process of obtaining a determination threshold by the allowable error determination unit 112 according to Embodiment 1.

First, as shown in FIG. 3, the imaging unit 101 images a highest resolution image 3001 and a lowest resolution image 3002, and then sends the images to the switching unit 115. Then, the switching unit 115 sends the highest resolution image 3001 to the high resolution image memory unit 109, and sends the lowest resolution image 3002 to the low resolution image memory unit 110. With this, the highest resolution image 3001 is stored in the high resolution image memory unit 109, and the lowest resolution image 3002 is stored in the low resolution image memory unit 110.

Moreover, a medium resolution image 3003 and a medium resolution image 3004 are manufactured by reduction processing in the image processing. When the lowest resolution image 3002 is a one-time magnification, the medium resolution image 3003 corresponds to an enlargement factor of 2 times and the highest resolution image 3001 corresponds to an enlargement factor of 8 times.

Therefore, the digital specimen manufacturing device 100 reduces the highest resolution image 3001 to ½ by image processing, and makes it the medium resolution image 3004. Similarly, the digital specimen manufacturing device 100 reduces the highest resolution image 3001 to ¼ by image processing, and makes it the medium resolution image 3003.

Moreover, the lowest resolution image 3002 corresponds to an image obtained by reducing the highest resolution image 3001 to ⅛. Therefore, when an image is generated by reducing the highest resolution image 3001 by image processing to ⅛, the lowest resolution image 3002 is a useful image of the ⅛ reduction image. Therefore, image processing for reducing the highest resolution image 3001 should be designed for generating the same image as the lowest resolution image 3002.

One of the indicators showing a degree of coincidence between two images is a peak signal-to-noise ratio (hereinafter, referred to as PSNR).

[Math. 1]

$$PSNR = 10 \cdot \log_{10}\left(\frac{MAX_I^2}{MSE}\right) \quad \text{(Expression 1)}$$

$$\text{where } MSE = \frac{1}{mn}\sum_{i=0}^{m-1}\sum_{j=0}^{n-1}[I(i, j) - K(j, j)]^2$$

Here, I (i, j) and K(i, j) denote pixel values of the two images, and MAX denotes the largest pixel value in all the pixels, and m and n denote the size of the images. When PSNR is higher, two images are similar. Therefore, by setting, as I (i, j), a reduced image obtained by performing ⅛ reduction on the highest resolution image 3001, and by setting, as K (i, j), the lowest resolution image 3002 imaged at a one-time magnification, the image quality of the reduced image can be quantitatively evaluated.

By showing a doctor who uses the digital specimen manufacturing device 100 the ⅛ reduced image and the lowest resolution image 3002 at the same time, PSNR when the two look the same to the eye is evaluated. As a result, if the reduction processing is performed for pushing PSNR above 38 dB in the case where a pair of two images is not distinguishable when PSNR exceeds 38 dB, it follows that the image equivalent to the captured image is obtained.

The reduction processing includes bilinear interpolation and bicubic interpolation. In order to avoid generating a turned edge due to thinning, however, a band limiting filter is usually also used. Therefore, in the control of PSNR, not only the selection of the interpolation processing method but also the design of the spatial band limiting filter should be considered.

Suppose that as shown in (a) in FIG. 4, 1/16 reduction processing is performed on the highest resolution image 4002 captured at magnification of 16 times on the lowest resolution image 4001. Suppose that PSNR between the 1/16 reduced image of the highest resolution image 4002 and the lowest resolution image 4001 is 36 dB.

Similarly to the above, when the level in which a doctor using the digital specimen manufacturing device 100 does not feel deterioration in image quality is PSNR=38 dB, the doctor recognizes the difference between the 1/16 reduced image and the actually captured lowest resolution image 4001. Therefore, when checking the image quality of the image obtained by 1/16 reduction on the highest resolution image 4002, the quality of the image obtained by the reduction processing cannot be guaranteed.

Therefore, as shown in (b) in FIG. 4, the image for checking the image quality is switched from the lowest resolution image 4001 to the medium image resolution image 4003. The medium resolution image 4003, in this example, is captured at magnification of two times, and is an image obtained by ⅛ reduction on the highest resolution image 4002. When a reduction rate is smaller, generally, an image quality is increased and PSNR is higher. In this example, PSNR between the ⅛ reduced image of the highest resolution image 4002 and the medium resolution image 4003 is 39 dB, which is higher than 38 dB which does not make a person feel that the image quality is deteriorated.

Therefore, when the ⅛ reduced image of the highest resolution image 4002 is used, it is possible to manufacture a digital specimen through image processing of reduction processing, without using the captured image.

With this check, an image having a reduction rate of greater than ⅛ of the highest resolution image 4002 has no problem with an image quality even after the image processing. For example, it is possible to generate a ¼ reduced image of the highest resolution image 4002 by the image processing. The ¼ reduced image has an imaging magnification of four times. As shown the medium resolution image 3004 in FIG. 3, it is possible to generate an image by image processing without capturing 16 images. Similarly, the ½ reduced image corresponding to the imaging magnification of eight times has no problem with image quality and can be generated only by image processing. Therefore, it is possible to generate the image by image processing without capturing 64 images.

In the case of (b) in FIG. 4, the total number of captured images is 261. Of the total, the number of the lowest resolution images 400 is one, the number of the medium resolution images 4003 is four (=2×2), and the number of the highest resolution images 4002 is 256 (=16×16). When the medium resolution image 4004 with an imaging magnification of four times and the medium resolution image 4005 with an imaging magnification of eighth times are captured, a further 80 images (=4×4+8×8) need to be captured. With the image generation by image processing, the imaging time can be reduced by 23% (=80/(261+80)).

To perform the operation described in (b) in FIG. 4, the image quality determination unit 102 includes the high resolution memory unit 109 for holding the high resolution image on which reduction processing is performed. Moreover, the image quality determination unit 102 includes the low resolution image memory unit 110 for holding the low resolution image that is actually captured, in order to calculate PSNR of the image quality evaluation.

The reduction processing unit 111 performs reduction processing on the image of the high resolution image memory unit 109. Specifically, the reduction processing unit 111 generates a reduced image of the high resolution image by reducing a high resolution image captured at the first magnification into an image of the second magnification that is the imaging magnification of the low resolution image.

The operation instruction unit 104 obtains information indicating whether or not the difference between the reduced image of the high resolution image and the low resolution image is within an allowable error range. When the information indicates that the difference is not within the allowable error range, the second magnification is updated to be a value larger than the second magnification and smaller than the first magnification, and the operation instruction unit 104 instructs the imaging unit 101 to recapture the low resolution image. Specifically, the operation instruction unit 104 obtains information indicating whether or not the difference is within the allowable error range from an input from the outside (an input by the doctor).

The allowable error determination unit 112 determines whether or not the difference between the reduced image of the high resolution image and the low resolution image is within the allowable error range. Specifically, the allowable error determination unit 112 obtains, as a determination threshold, the difference between (i) the reduced image and (ii) the low resolution image when the information obtained by the operation instruction unit 104 is within the allowable error range. The allowable error determination unit 112 determines whether or not the difference between the reduced image of the high resolution image and the low resolution image is within the allowable error range, by comparing the difference between the reduced image and the low resolution image with the determination threshold.

Then, the operation instruction unit 104 obtains, according to a determination result by the allowable error determination unit 112, information indicating whether or not the difference is within the allowable error range, and instructs the imaging unit 101 to recapture the low resolution image by updating the second magnification to generate a value greater than a previously updated second magnification and smaller than the first magnification, until the information is obtained indicating the difference is within the allowable error range.

Then, every time the operation instruction unit 104 updates the second magnification, the reduction processing unit 111 reduces the high resolution image into an image of the second magnification after being updated, and generates a reduced image of the high resolution image.

Then, every time the operation instruction unit 104 updates the second magnification and instructs the imaging unit 101 to recapture the low resolution image, the allowable error determination unit 112 determines whether or not the difference between the low resolution image captured at the second magnification after being updated by the imaging unit 101 and the reduced image generated by the reduction processing unit 111.

Specifically, the allowable error determination unit 112 receives PSNR that is not regarded as deterioration of image quality as a determination threshold from a threshold database 116. Then, the allowable error determination unit 112 calculates PSNR between the image from the low resolution image memory unit 110 and the image from the reduction processing unit 111. When PSNR falls below the determination threshold, the allowable error determination unit 112 instructs the imaging unit 101 to recapture the low resolution image via the operation instruction unit 104.

The imaging unit 101, on receipt of the recapture instruction, increased an imaging magnification as described in (b) in FIG. 4 to recapture, and stores this in the low resolution image memory unit 110. The recapture is repeated until PSNR exceeds the determination threshold.

Meanwhile, when PSNR between the image from the low resolution image memory unit 110 and the image from the reduction processing unit 111 exceeds the determination threshold, the operation instruction unit 104 instructs the image filter providing unit 103 to provide a band limiting filter for the reduction processing to the image processing unit 108. Moreover, the operation instruction unit 104 instructs the image display instruction unit 105 to start an operation related to image display.

In other words, the reduction processing unit 111 reduces, using the band limiting filter, the high resolution image into an image of the second magnification to generate a reduced image. The image filter providing unit 103 receives the band limiting filter used in reduction processing by the reduction processing unit 111 from the reduction processing unit 111, and provides it to the image processing unit 108.

Then, the image processing unit 108 performs, using the band limiting filter provided from the image filter providing unit 103, and outputs an image of the digital specimen to the display unit 114 by performing reduction processing on the high resolution image.

Specifically, the image processing unit 108 obtains the third magnification which is an imaging magnification greater than the updated second magnification and smaller than the first magnification and is an imaging magnification of the digital specimen, and outputs an image of the digital specimen by reduction processing for changing the high resolution image to an image of the third magnification.

Here, the reduction processing by the reduction processing unit 111 is performed in the following steps.
(1) Low pass filtering
(2) Coordinate transformation
(3) Interpolation processing The coordinate transformation is processing for identifying the location of a pixel after reduction that corresponds to a location of the pixel before reduction. The interpolation processing is processing for calculating a pixel value in the corresponding location identified by coordinate transformation. Although the interpolation processing includes nearest neighbor, bilinear, and bicubic, one or more exemplary embodiments or features disclosed herein do not limit the applications, and any of the interpolation methods can be used.

It should be noted that when the image size is reduced, high frequency component emerges as folding noise which cannot be expressed in a sampling frequency after reduction. Therefore, the low pass component is maintained, and the folding noise is reduced by the low pass filter which cuts the high pass component.

The reduction processing unit 111 outputs the low pass filter to the image filter providing unit 103, the image filter providing unit 103 provides, on receipt of an operation instruction from the operation instruction unit 104, the low pass filter to the image processing unit 108.

When the image display instruction unit 105 is instructed by the operation instruction unit 104 to start an operation of image display, the image display instruction unit 105 provides an instruction to the image reading control unit 106 and the image processing unit 108 in order to generate a display image. First, the instruction to the image reading control unit 106 is an instruction of reading part of the region in the captured image, and is determined by a reference position and a magnification of the image indicated by the doctor who uses the digital specimen manufacturing device 100.

Figure 5:
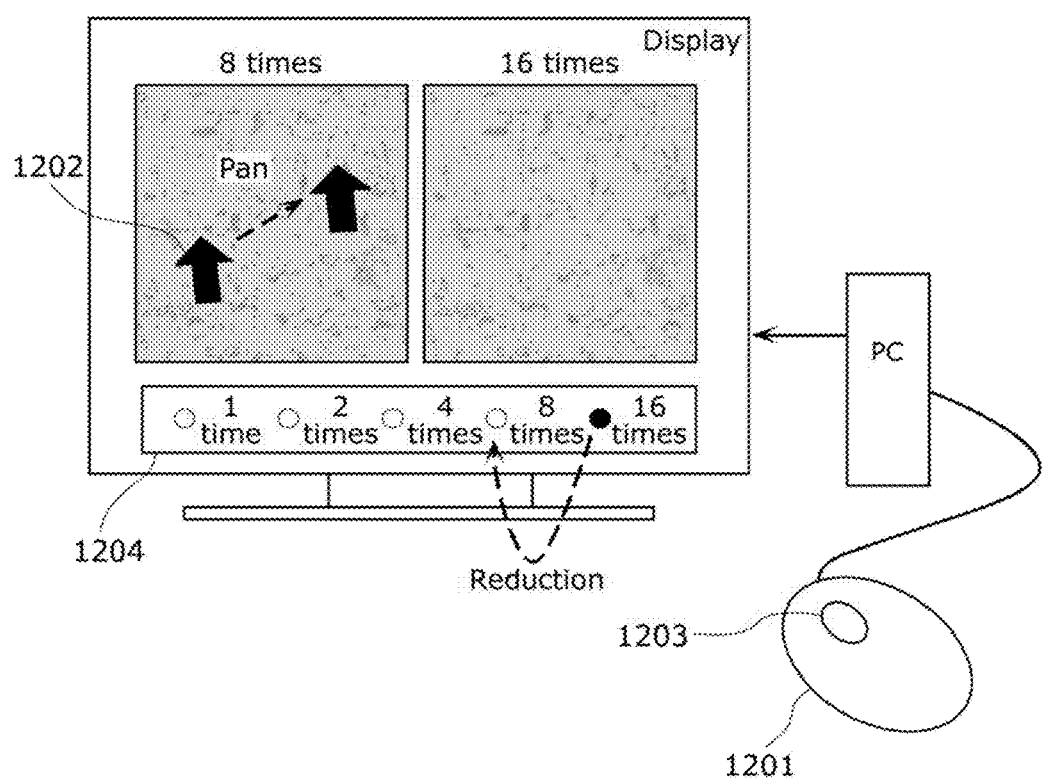
FIG. 5 is an example of an operation screen when a doctor operates a digital specimen manufacturing device according to Embodiment 1.

The image reference method input unit 113 receives the instruction from the doctor, and informs the image display instruction unit 105 of the reference position and the magnification of the image. FIG. 5 is an example of an operation screen used by the doctor when operating the digital specimen manufacturing device 100 according to Embodiment 1.

The doctor moves a cursor 1202 on the display using a mouse 1201, and inputs a viewpoint which is the central point of the reference position of the image. Moreover, the doctor rotates a wheel 1203 attached to the mouse 1201, and controls enlargement or reduction of the image.

Figure 6:
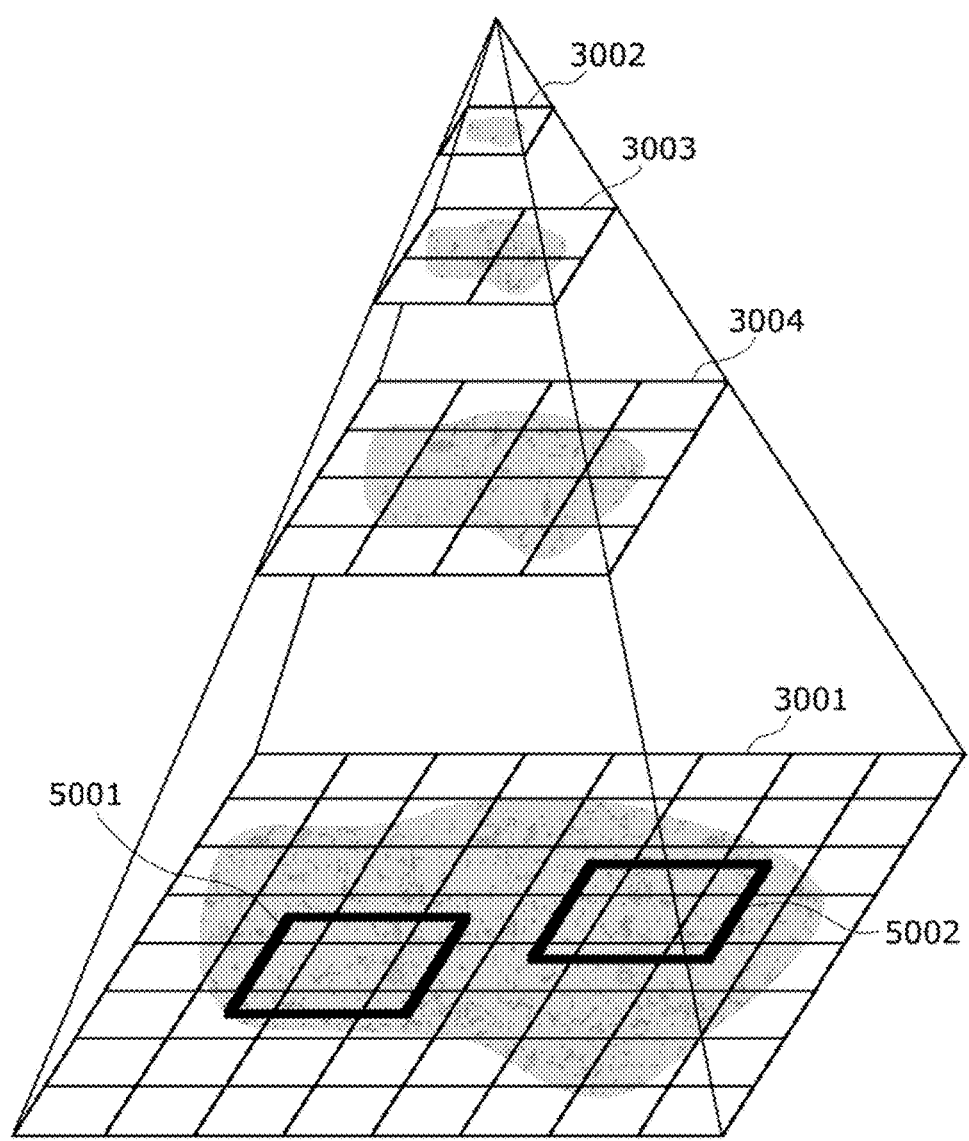
FIG. 6 is a diagram describing a process when a reference region of an image is changed by a digital specimen manufacturing device according to Embodiment 1.

Suppose that at a certain point, the doctor watches a reference region 5001 shown in FIG. 6 on the display. Next, the doctor changes the reference position of the image by moving the cursor 1201 with the mouse 1201, and inputs the instruction of pan to the image reference method input unit 113 that the reference region 5002 is displayed on the display. The image reference input unit 113 passes the image coordinates of the reference region 5002 to the image display instruction unit 105. FIG. 6 is a diagram describing a process when a reference region of an image is changed by the digital specimen manufacturing device 100 according to Embodiment 1.

The image display instruction unit 105 first passes the image coordinates of the received reference image 5002 to the image reading control unit 106. The image reading control unit 106 instructs the image memory unit 107 to read the highest resolution image 3001 including the reference region 5002.

The image memory unit 107 reads the highest resolution image 3001 and outputs it to the image processing unit 108. The image display instruction unit 105 passes the image coordinates of the received reference image 5002 to the image processing unit 108.

The image processing unit 108 cuts out the reference region 5002 from the highest resolution image 3001 received from the image memory unit 107, and outputs it to the display unit 114. The display unit 114 displays the reference region 5002 on the display. With this, the doctor who uses the digital specimen manufacturing device can observe the reference region 5002 that is a new reference region.

Figure 7:
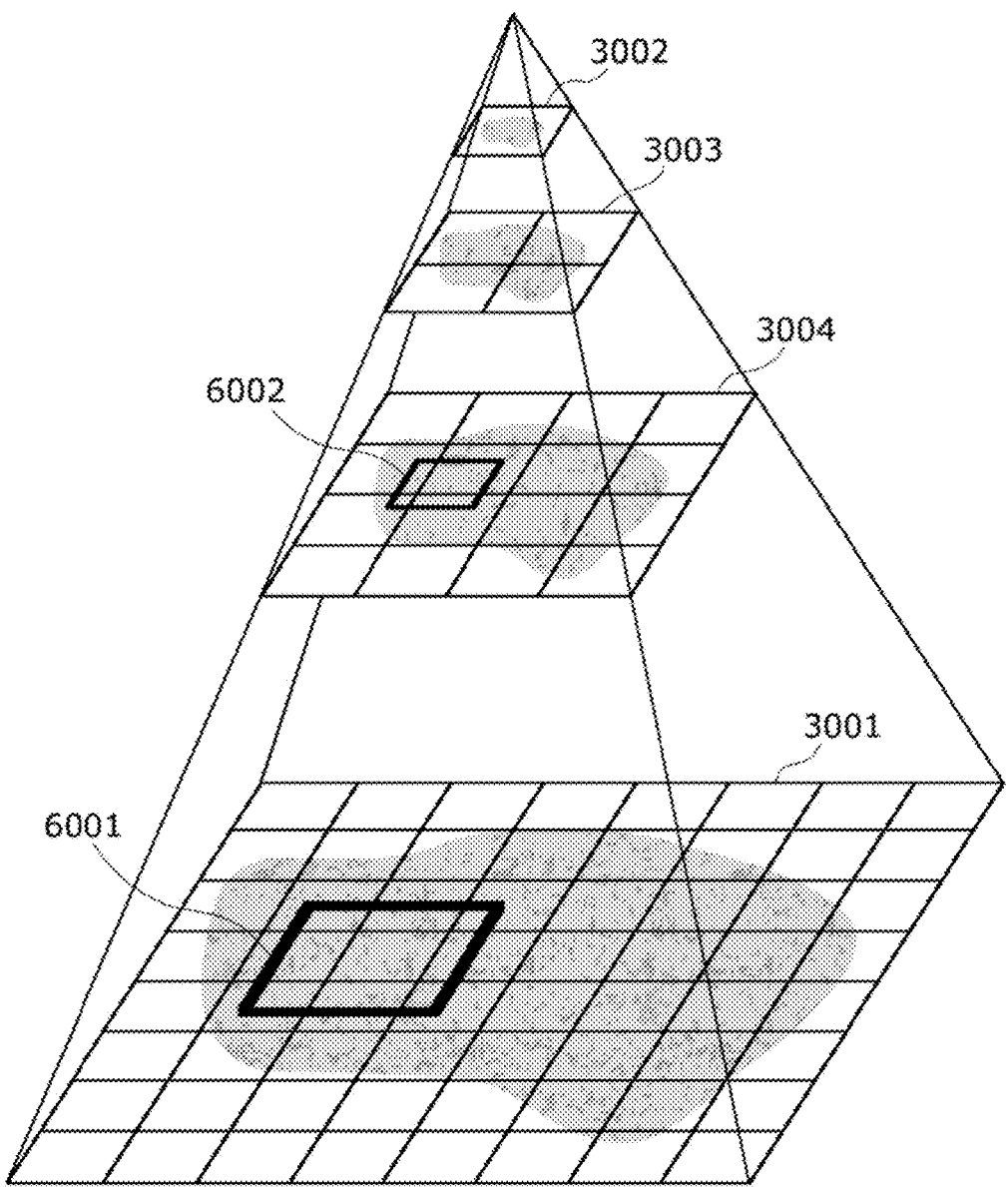
FIG. 7 is a diagram describing a process when the magnification of an image is changed by a digital specimen manufacturing device according to Embodiment 1.

FIG. 7 is a diagram describing a process when the magnification of an image is changed by the digital specimen manufacturing device 100 according to Embodiment 1.

Suppose that at a certain point, the doctor watches the reference region 6001 shown in FIG. 7 on the display. Next, the doctor inputs an instruction of zoom to the image reference method input unit 113 such that a reference 6002 is displayed on the display by reducing, by 2/1, the magnification of the image.

Here, suppose that the doctor uses an enlargement factor selection button 1204 shown in FIG. 5 to select the enlargement factor and the doctor watches an image of 16 times. When the doctor presses the button of the enlargement factor of eight times, the image is reduced to ½. The image reference method input unit 113 passes the image coordinates and the magnification (½ reduction) of the reference region 6001 to the image display instruction unit 105.

The image display instruction unit 105 first passes the image coordinates of the received reference image 6001 to the image reading control unit 106. The image reading control unit 106 instructs the image memory unit 107 to read the highest resolution image 3001 including the reference region 6001.

The image memory unit 107 reads the highest resolution image 3001 received from the imaging unit 101 and outputs it to the image processing unit 108. The image display instruction unit 105 passes the image coordinates of the received reference image 6001 to the image processing unit 108.

The image processing unit 108 cuts out the reference region 6002 from the highest resolution image 3001 received from the image memory unit 107, and performs ½ reduction image processing on the reference region 6001 according to the magnification (½ reduction) received from the image display instruction unit 105, and outputs it to the display unit 114. The display unit 114 displays the reference region 6002 on the display, and the doctor who uses the digital specimen manufacturing device 100 can observe the reference region 6002 that is a new reference region.

Figure 8:
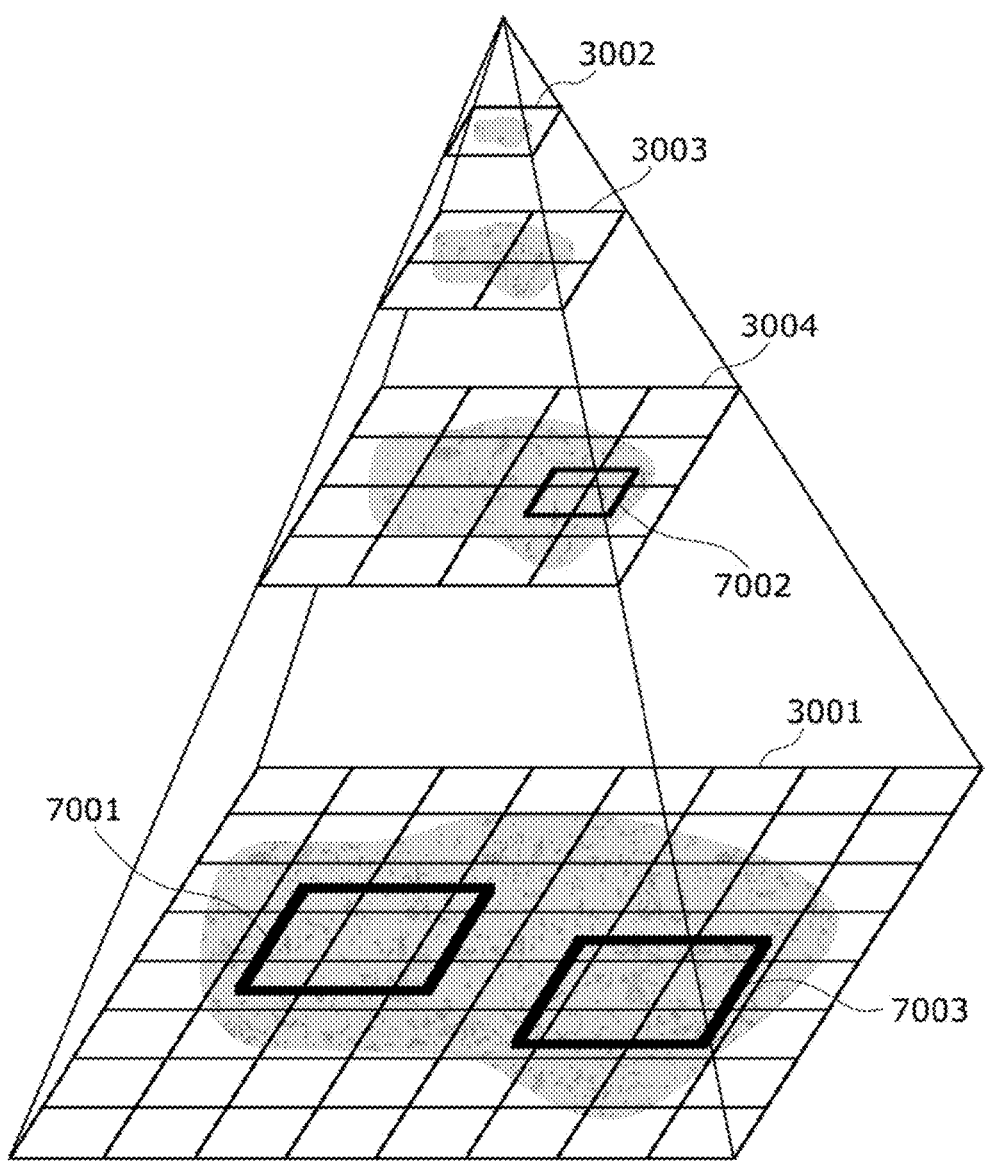
FIG. 8 is a diagram describing a process when a reference region and magnification of an image are changed by a digital specimen manufacturing device according to Embodiment 1.

FIG. 8 is a diagram describing a process when a reference region and magnification of an image are changed by the digital specimen manufacturing device 100 according to Embodiment 1.

Suppose that at a certain point, the doctor who uses the digital specimen manufacturing device 100 watches a reference region 7001 shown in FIG. 8 on the display. Next, the doctor inputs an instruction of zoom to the image reference method input unit 113 such that a reference region 7002 is displayed on the display by changing the magnification of the image.

Then, the image reference method input unit 113 passes the image coordinates and the magnification (½ reduction) of a medium reference region 7003 that corresponds to a magnification of two times of the reference region 7002, to the image display instruction unit 105.

The image display instruction unit 105 first passes the image coordinates of the received medium reference image 7003 to the image reading control unit 106. The image reading control unit 106 instructs the image memory unit 107 to read the highest resolution image 3001 including the medium reference region 7003.

The image memory unit 107 reads the highest resolution image 3001 and outputs it to the image processing unit 108. Furthermore, the image display instruction unit 105 passes the image coordinates of the received medium reference image 7003 to the image processing unit 108.

The image processing unit 108 cuts out the medium reference region 7003 from the highest resolution image 3001 received from the image memory unit 107, and performs ½ reduction image processing on the reference region 6001 according to the magnification (½ reduction) received from the image display instruction unit 105, and outputs it to the display unit 114. The display unit 114 displays the reference region 7002 on the display, and the doctor who uses the digital specimen manufacturing device 100 can observe the reference region 7002 that is a new reference region.

Figure 9:
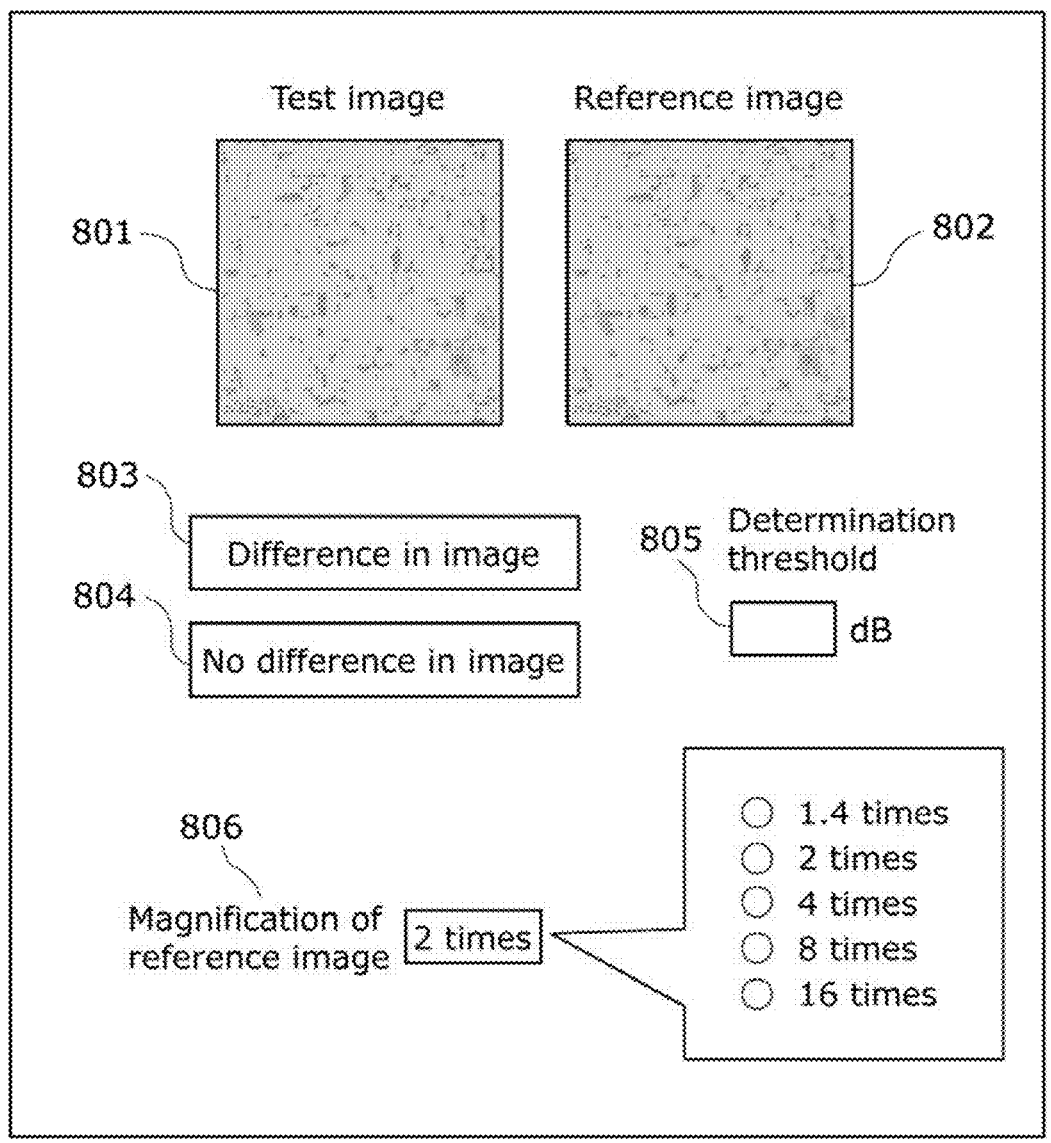
FIG. 9 is a diagram showing an example of an input screen for obtaining a determination threshold by an allowable error determination unit according to Embodiment 1.

FIG. 9 is a diagram showing an example of an input screen for obtaining a determination threshold by the allowable error determination unit 112 according to Embodiment 1.

The digital specimen manufacturing device 100, as shown in FIG. 9, presents a test image 801 and a reference image 802 to the doctor. The doctor observes a difference between the test image 801 and the reference image 802. When there is a difference between the images, the doctor presses the button 803. When there is no difference between the images, the doctor presses the button 804.

The allowable error determination unit 112 displays the lowest resolution image 3002 located at the top of the pyramid shown in FIG. 3 on the display as a reference image 802. Meanwhile, the allowable error determination unit 112 causes the test image 801 to display a ⅛ reduced image obtained by performing a ⅛ reduction processing on the highest resolution image 3001 on the display.

When the doctor presses the button 804 and determines that there is no difference between the test image 801 and the reference image 802, the allowable error determination unit 112 calculates PSNR with the above described expression 1, and this becomes the determination threshold. In the case where many cases were stored in the past and the determination threshold is approximately obvious, the allowable error determination unit 112 can obtain the determination threshold by a direct input of the determination threshold to the numerical value input unit 805.

Meanwhile, when the doctor presses the button 803 and determines that there is a difference between the test image 801 and the reference image 802, the test image 801 is switched. A method for switching the test image 801 is identical to the example described in FIG. 4. In other words, in the state in (a) in FIG. 4, the lowest resolution image 4001 that is actually captured is displayed in the reference image 802. In the test image 801, a 1/16 reduced image obtained by performing a 1/16 reduction processing on the highest resolution image 4002 is displayed.

The doctor observes a difference between the test image 801 and the reference image 802, presses the button 803, and informs the allowable error determination unit 112 that there is a difference between the images.

Then, in order to enhance the image quality of the test image, the reduction rate of the highest resolution image 4002 is changed from 1/16 to ⅛. Therefore, in the display, a magnification display 806 of the current reference image and the enlargement factors to be selected are displayed. When the user selects the enlargement factor, the imaging unit 101 selects the objective lens with a corresponding enlargement factor and automatically sets the objective lens.

With this, the medium resolution image 4003 is captured, and the medium resolution image 4003 is displayed in the reference image 802. In the test image 801, a ⅛ reduced image obtained by performing a ⅛ reduction processing on the highest resolution image 4002 is displayed.

In the example of FIG. 4, the doctor determines that there is no difference between the test image 801 and the reference image 802, the doctor presses the button 804. The allowable error determination unit 112 is informed that the difference between the test image 801 and the reference image 802 is allowable. With this, the allowable error determination unit 112 calculates PSNR between the test image 801 and the reference image 802, and determines that 39 dB is a determination threshold in the example of (b) in FIG. 4.

Although a method for further obtaining an image with a reduced imaging magnification as a way to improve the image quality of the test image 801 is described, the imaging magnification of ⅛ is mere example, and other magnifications such as 1/10 are acceptable. Moreover, the imaging magnification is maintained at a 1/16 reduction, the image quality may be improved by reviewing the image processing method or the band limiting filter.

One of the reasons for image quality deterioration is a difference in camera characteristics. Since the high resolution image and the low resolution image are necessary, image capture with a camera is performed twice. In the case of the high resolution image, as shown in the highest resolution image 3001 as shown in FIG. 3, a camera imaging range is narrow and the camera captures a certain part of the object. In the case of the low resolution image, as shown in the lowest resolution image 3002 as shown in FIG. 3, a camera imaging range is wide and the camera captures the whole of the object.

Generally, the illumination on the object has shading, and the distribution of illumination is different between the part of the object and the whole of the object. When the distribution of illumination is different, camera sensitivity is affected. When the illumination is poor, noise is generally increased. Conversely, when the illumination is very high, blown out highlights occur.

For this reason, when the difference in image quality between the test image 801 and the reference image 802 is noise, it is necessary to eliminate noise from the reference image 802. Noise elimination can be performed with such methods as smoothing processing for replacing a pixel value of the target with average value of the pixel values of the pixels, and cut of high pass with a band limiting filter. One or more exemplary embodiments or features disclosed herein do not limit a method for improving the image quality of the test image.

Moreover, the setting of a determination threshold is performed when the digital specimen manufacturing device 100 operates for the first time or when the determination threshold is reviewed. The specimen is manufactured by slicing a sample and then staining the sliced sample. According to the condition of slice and staining, various textures and color shares can emerge.

When the digital specimen manufacturing device 100 operates for the first time, the image quality comparison in FIG. 9 is made with a plurality of specimens, and then a determination threshold is determined. Since specimens with various slice conditions and staining conditions are added after the digital specimen manufacturing device 100 operates, a determination threshold can be changed. Therefore, in collaboration with a management process of the specimen manufacturing and the like, a check of the determination threshold is performed.

Moreover, as a result of reaffirmation of the determination threshold, various trends emerge such as a staining method in which the determination threshold is little updated and a staining method in which the determination threshold is frequently updated. Therefore, with reference to a temporal trend, it is effective to manage the timing of updating the determination threshold.

Moreover, according to types of diseases and medical conditions, the specimen with a stable image quality and the specimen with a volatile image quality can exist. Therefore, it is useful to check an update trend of the determination threshold by classifying the specimens according to the diseases and medical conditions.

As described above, since a change in image quality is more likely to occur when the camera characteristics are changed, it is useful that the digital specimen manufacturing device 100 receives a parameter of the camera characteristics from the imaging unit 101 and monitors the change.

Regarding the instruction of recapture, the operation instruction unit 104 may operate automatically or the user of the digital specimen manufacturing device 100 may provide an instruction to the operation instruction unit 104.

The operation instruction unit 104 automatically operates when the imaging magnification is changed, for example. A change in magnification is set to two times in advance, and as described above, the operation instruction unit 104, by itself, instructs the imaging unit 101 to change from 1/16 reduction to 1/8 reduction.

Meanwhile, the user provides an instruction to the operation instruction unit 104 when the condition of a slice of specimen is significantly changed and the user attempts to adjust the imaging magnification. The user controls the imaging unit 101 via the operation instruction unit 104 from the image reference method input unit 113.

As described above, the operation instruction unit 104 has five roles to be described later. The first role is to capture the highest resolution image 4002 and the lowest resolution image 4001. The second role is to capture the medium resolution image until information is obtained indicating that the allowable error determination unit 112 exceeds the determination threshold. The third role is to receive a result of image quality evaluation by the user, to instruct the imaging unit 101 to generate the medium resolution image when there is a difference between the test image 801 and the reference image 802, and to instruct the threshold database 116 to store the determination threshold when there is no difference between the test image 801 and the reference image 802. The fourth role is to provide an instruction to provide an image filter to the image processing unit 108. The fifth role is to instruct the image display instruction unit 105 and the image processing unit 108 to start an operation.

Figure 10:
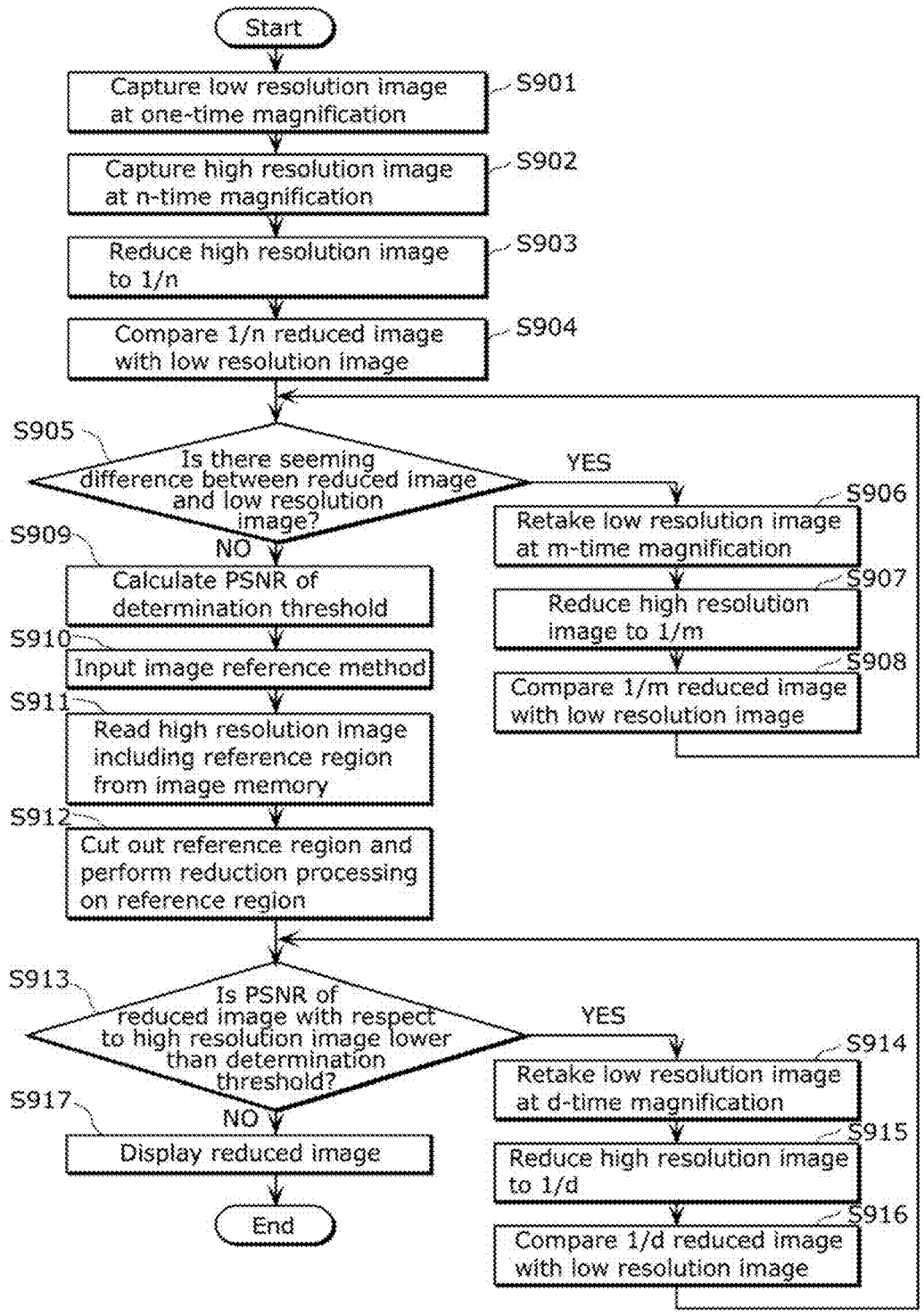
FIG. 10 is a flowchart showing an operation flow of a digital specimen manufacturing device according to Embodiment 1.

FIG. 10 is a flowchart showing an operation flow of the digital specimen manufacturing device 100 according to Embodiment 1.

From Step S901 to Step S908, an operation is performed to determine a determination threshold obtained by the allowable error determination unit 112.

First, the imaging unit 101 captures a low resolution image (the lowest resolution image) at one-time magnification (the second magnification) (S901).

Moreover, the imaging unit 101 captures a high resolution image (the highest resolution image) at n-time resolution (the first magnification) (S902).

Then, the reduction processing unit 111 reduces the high resolution image to 1/n, and calculates 1/n reduced image (S903).

Then, the image processing unit 108 applies the 1/n reduced image of the high resolution image to the test image and applies the low resolution image to the reference image, and presents them to the doctor who uses the digital specimen manufacturing device 100 (S904).

Then, the operation instruction unit 104 obtains a comparison result of the test image and the reference image through an input from the doctor (S905). Proceed to Step S906 when the operation instruction unit 104 is informed that there is a seeming difference between the two images (YES in S905). Proceed to Step S909 when the operation instruction unit 104 is informed that there is no difference between the two images (NO in S905).

Then, in Step S906, the imaging unit 101, based on the instruction from the operation instruction unit 104, recaptures the low resolution image by setting the imaging magnification at m times to increase the image quality of the 1/n reduced image of the high resolution image (S906).

It should be noted that m is a value greater than the second magnification and smaller than the first magnification (n>m>1). In other words, the imaging unit 101 captures the medium resolution image at magnification greater than one time in order to obtain the lowest resolution image captured at one-time magnification with a higher resolution. In the case of (b) in FIG. 4, the imaging unit 101 captures the medium resolution image 4003 by setting m=2.

Next, the reduction processing unit 111 reduces the high resolution image to 1/m, and calculates a 1/m reduced image (S907).

Then, the image processing unit 108 applies the 1/m reduce image of the high resolution image to the test image and applies the low resolution image with m-time magnification to the reference image, and present them to the doctor who uses the digital specimen manufacturing device 100 (S908). After Step S908 ends, return to Step S905.

Moreover, when the flow proceeds to Step S906 again, the imaging unit 101 recaptures the low resolution image by changing m-time magnification to a higher magnification in order to increase the image quality of the 1/m reduced image of the high resolution image.

When there is no difference between the test image and the reference image, proceed to Step S909.

In Step S909, the allowable error determination unit 112 calculates PSNR between the test image and the reference image by the above described Expression 1, and determines that this is a determination threshold (S909).

Then, the image display instruction unit 105 obtains information of the reference region which indicates a specific location that the doctor using the digital specimen manufacturing device 100 (S910) looks at and a specific magnification that the doctor looks at.

Then, the image processing unit 108 reads the high resolution image including the reference region from the image memory unit 107 (S911). For example, in the case of FIG. 7, since the reference region 6001 is included in the highest resolution image 3001, the highest resolution image 3001 is read from the image memory unit 107.

Then, the image processing unit 108 cuts out the reference region 6001 from the highest resolution image 3001, and performs 1/k reduction processing on each pixel (S912).

Next, the allowable error determination unit 112 calculates PSNR of 1/l reduced image with respect to the high resolution image, and compares PSNR with a determination threshold (S913). When the allowable error determination unit 112 determines that PSNR of the reduced image is lower than the determination threshold (YES in S913), proceed to Step S914.

In Step S914, the imaging unit 101, based on the instruction from the operation instruction unit 104, recaptures the low resolution image by changing the imaging magnification to d times such that PSNR of the reduced image exceeds the determination threshold (S914). Here, the imaging magnification of d times is magnification greater than the imaging magnification of the latest low resolution image and smaller than the imaging magnification of the high resolution image.

It should be noted that how to determine the magnification d is arbitrary, and therefore one or more exemplary embodiments or features disclosed herein do not impose a limit. For example, as shown in FIG. 4, a method for increasing the magnification by two times each time and a method for sequentially increasing the magnification according to the magnification of the objective lens attached to a microscope are adopted.

Then, the reduction processing unit 111 reduces the high resolution image to 1/d, and calculates 1/d reduced image (S915).

Then, the allowable error determination unit 112 applies the 1/d reduced image of the high resolution image to the test image and applies the low resolution image with d-time magnification to the reference image, and compares the reduced image with the low resolution image (S916). Then, return to Step S913.

When the allowable error determination unit 112 determines that PSNR of the reduced image is no less than the determination threshold (NO in S913), the allowable error determination unit 112 sends an output of the image processing unit 108 to the display unit 114, and causes it to display the reduced image (S917).

Figure 11:
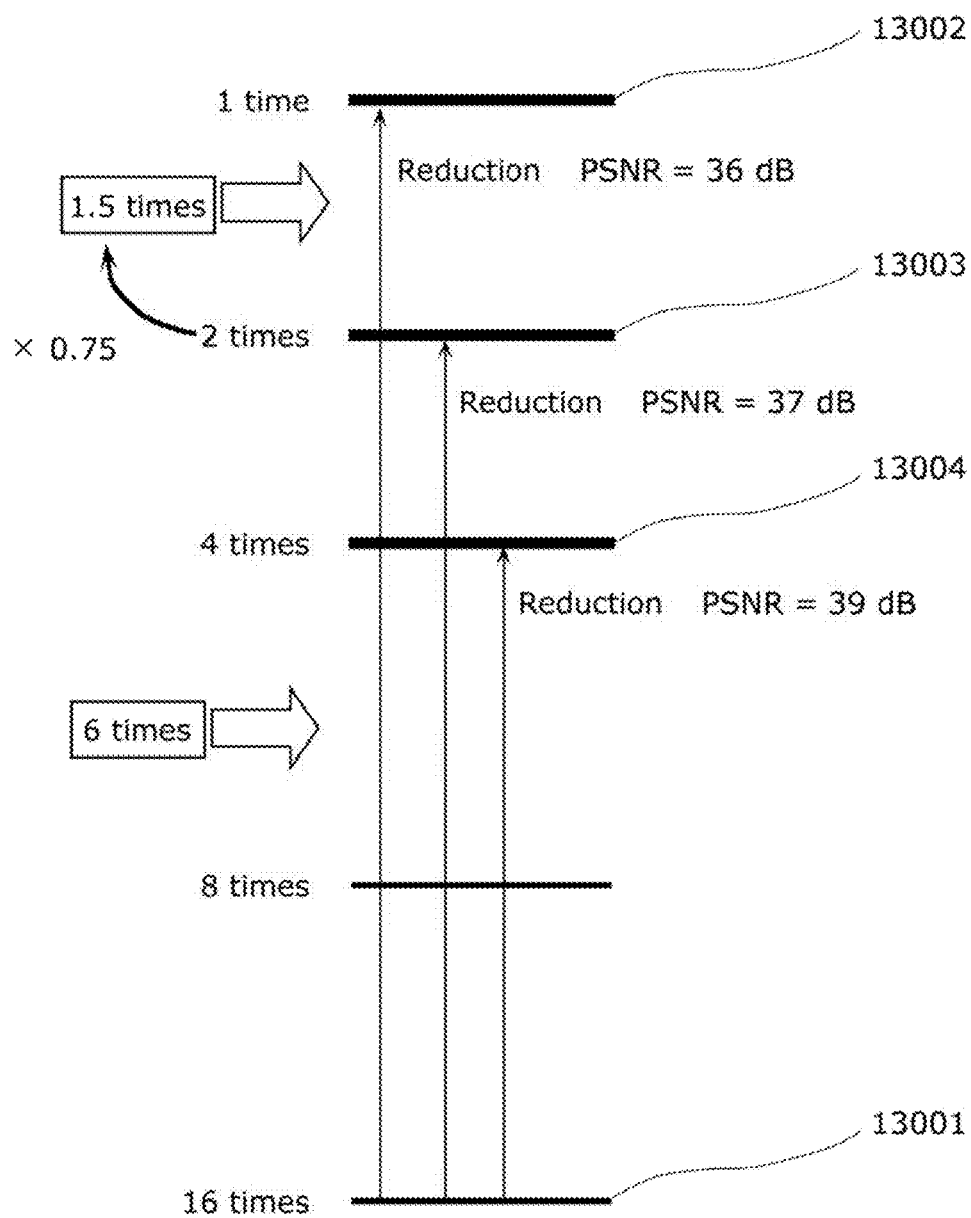
FIG. 11 is a diagram showing an example of where an imaging unit recaptures a low resolution image twice on the instructions of an operation instruction unit according to Embodiment 1.

FIG. 11 is a diagram showing an example of where the imaging unit 101 recaptures the low resolution image twice, based on the instruction of the operation instruction unit 104 according to Embodiment 1.

The imaging unit 101 captures, after capturing a highest resolution image 13001, a lowest resolution image 13002 which corresponds to 1/16 reduced image of the highest resolution image 13001. Then, suppose that the reduction processing unit 111 performs 1/16 reduction processing on the highest resolution image 13001 and PSNR with respect to the lowest resolution image 13002 that is 1/16 reduced image becomes 36 dB.

In this case, when a determination threshold in which the difference between the reduced image and the lowest resolution image cannot be found is 38 dB, it is determined that the difference between the 1/16 reduced image and the lowest resolution image is too large. Therefore, the imaging unit, based on the instruction from the operation instruction unit 104, recaptures the medium resolution image 13003 by changing the imaging magnification to 1/8 time. With this, PSNR with respect to the medium resolution image 13003 that is 1/8 reduced image obtained from 1/8 reduction processing on the highest resolution image 13001 becomes 37 dB, and falls below the image quality determination threshold of 38 dB again.

Suppose the imaging unit 101, at the time of a second recapture, obtains the medium resolution image 13004 by imaging through zooming that corresponds to 1/4 time. In this case, PSNR with respect to the medium resolution image 13004 of 1/4 reduced image of the highest resolution image 13001 becomes 39 dB, and exceeds the image quality determination threshold of 38 dB.

In the above condition, the captured images stored in the image memory unit 107 are the highest resolution image 13001, the lowest resolution image 13002, and the medium resolution images 13003 and 13004. There is no worry that the quality of the actually captured images is deteriorated by image processing. Data access is only a read time, and it does not take much time to perform image reduction processing.

Therefore, in the case of FIG. 11, when the magnification is one time, two times, and four times, the lowest resolution image 13002, the medium resolution image 13003, and the medium resolution image 13004 are displayed as they are.

When an enlargement factor is one time to four times, a reduce image may be generated through image processing on the two-time medium resolution image 13003 or the four-time medium resolution image 13004. When the magnification of the displayed image is 1.5 times, 0.75-time reduction processing may be performed on the two-time medium resolution image 13003.

Meanwhile, when the magnification is between the magnification of the highest resolution image 13001 and the medium resolution image 13004, PSNR of the reduced image does not fall below the determination threshold. Therefore, the reduced image can be applied to the displayed image. As shown in FIG. 11, when the six-fold display image is necessary, 3/8 reduction processing may be performed on the highest resolution image 13001.

As described above, the digital specimen manufacturing device 100 can reduce the number of images to be actually captured, and simplify digitization, and allows the doctor to freely observe a sample for diagnosis of the disease by changing the reference position and the magnification of the image. In other words, since the digital specimen manufacturing device 100 allows the user to observe the specimen at various magnifications and from various viewpoints by freely changing zoom and pan, it is possible to efficiently digitize medical information and contribute to improving a medical workflow for determining the disease name or the medical condition. Moreover, when the specimen is digitally picked out when the past cases are referred, it is possible to partially help the user determine the disease name or the medical condition through image processing.

As described above, when a difference between the reduced image of the high resolution image and the low resolution image is not within an allowable error range, the digital specimen manufacturing device 100 according to Embodiment 1 performs a recapture by enlarging the imaging magnification of the low resolution image, and performs a recapture until the difference between the recaptured low resolution image and the reduced image of the high resolution image is within the allowable error range, and then outputs a digital specimen with magnification that is greater than the imaging magnification of the recaptured low resolution image. With this, the digital specimen manufacturing device 100 can maintain the image quality of the reduced image of the high resolution image at a certain standard when the digital specimen is manufactured. With this, the digital sample manufacturing device 100 is capable of maintaining the quality of the image generated by image processing such as reduction from the captured image at a certain standard and of freely changing zoom and pan.

Moreover, the digital specimen manufacturing device 100 determines whether or not the difference between the reduced image of the high resolution image and the low resolution image is within an allowable error range, and performs a recapture by enlarging the imaging magnification of the low resolution image until the difference is within the allowable error range. With this, the digital specimen manufacturing device 100 can determine whether or not the difference is within the allowable error range without a doctor's diagnosis when the digital specimen is manufactured, and can maintain the image quality of the reduced image of the high resolution image at a certain standard. With this, the digital sample manufacturing device 100 is capable of maintaining the quality of the image generated by image processing such as reduction from the captured image at a certain standard and of freely changing zoom and pan.

Moreover, the digital specimen manufacturing device 100 obtains, from an input from the outside, information indicating whether or not the difference between the reduced image of the high resolution image and the low resolution image is within the allowable error range, and obtains, as a determination threshold, the difference between the reduced image and the low resolution image when the information indicates that the difference is within the allowable error range. Then, the digital specimen manufacturing device 100 determines, using the determination threshold, whether or not the difference between the reduced image of the high resolution image and the low resolution image is within the allowable error range. With this, when the doctor determines that the difference between the reduced image of the high resolution image and the low resolution image is within the allowable error range and provides an instruction to the digital specimen manufacturing device 100, the digital specimen manufacturing device 100 obtains a determination threshold and can make a determination.

Moreover, the digital specimen manufacturing device 100 calculates PSNR as a difference between the reduced image of the high resolution image and the low resolution image, and determines whether or not the difference is within the allowable error range. In other words, the digital specimen manufacturing device 100 can determine whether or not the difference is within the allowable error range, by digitizing the image quality.

Moreover, when the difference between the reduced image of the high resolution image and the low resolution image is within the allowable error range, the digital specimen manufacturing device 100 outputs an image of the digital specimen by using the band limiting filter used for generating the reduced image and by performing reduction processing on the high resolution image. With this, the digital specimen manufacturing device 100 can generate the reduced image having the same image quality as that of the actually captured image, and can output an image of the digital specimen.

Embodiment 2

The present embodiment will describe a digital specimen manufacturing device which can freely change zoom and pan in image processing after performing reduction processing on the captured image, and can maintain the image quality at a certain standard. Especially, the digital specimen manufacturing device according to Embodiment 2 can correct the difference in color feature between when the low resolution image is captured and when the high resolution image is captured, and equalize the image quality of the image generated by image processing with the image quality of the actually captured image.

Figure 12:
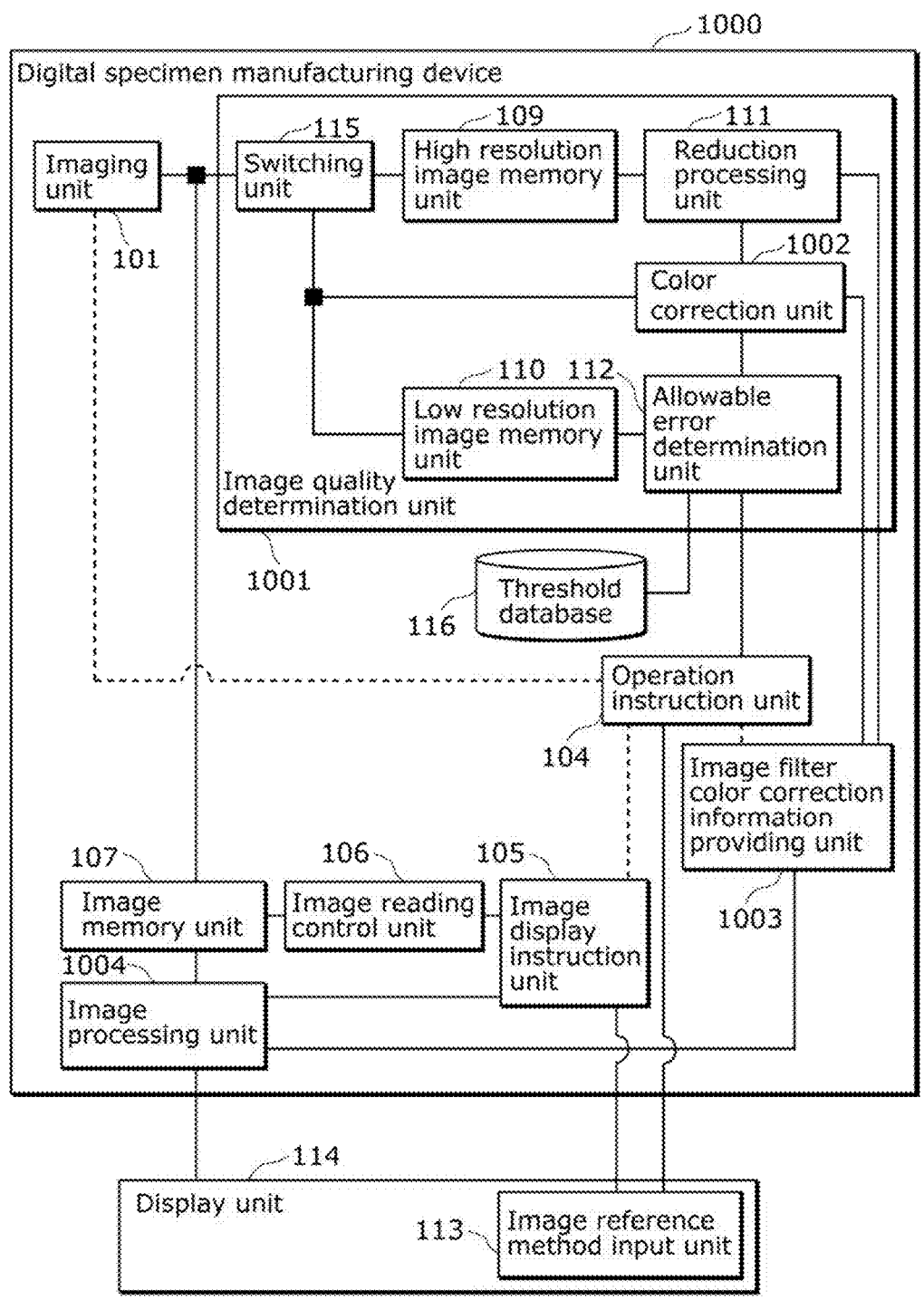
FIG. 12 is a block diagram showing a functional configuration of a digital specimen manufacturing device according to Embodiment 2.

FIG. 12 is a block diagram showing a functional configuration of a digital specimen manufacturing device 1000 according to Embodiment 2. It should be noted that the same reference signs are assigned to the structural elements of the digital specimen manufacturing device 1000 that are the same as those of the digital specimen manufacturing device 100 according to Embodiment 1 shown in FIG. 1. A detailed description thereof will be omitted.

As shown in FIG. 12, the digital specimen manufacturing device 1000 includes an image quality determination unit 1001, an image filter color correction information providing unit 1003, and an image processing unit 1004 in place of an image quality determination unit 102, an image filter providing unit 103, and an image processing unit 108 that are included in the digital specimen manufacturing device 100 according to Embodiment 1. The digital specimen manufacturing device 1000 generates a medium image while correcting the difference in color feature between the captured images. Moreover, the image quality determination unit 1001 has a configuration in which a color correction unit 1002 is added to structural elements of the image quality determination unit 102 of the digital specimen manufacturing device 100 according to Embodiment 1.

The image quality determination unit 1001 has a function of matching the color feature of the reduced image outputted by the reduction processing unit 111 and the image stored in the low resolution image memory unit 110. The color correction unit 1002 has this function.

With this, the color correction unit 1002 corrects the difference in color feature between the reduced image of the high resolution image and the low resolution image. Specifically, the color correction unit 1002 generates color correction information for correcting the difference in color feature, from the color feature of the imaging unit 101 when the low resolution image is captured and the color feature of the imaging unit 101 when the high resolution image is captured.

Generally, there are cases of the difference in color feature when the images are different in imaging timing. For example there are the difference in white balance across the image, and the difference in partial shade. Currently, most of the digital still cameras and video cameras are equipped with automatic adjustment functions of white balance. When the illumination is high, a person has the impression that the color of the illumination is white. In reality, the illumination has a certain degree of shade such as "reddish white" in a room inside and "bluish white" outdoors. Therefore, the white balance adjustment is to adjust a white shade by adjusting the camera RGB balance when an image is captured outdoors and when an image is captured indoors.

Generally, as shown in the highest resolution image 3001 in FIG. 3, when narrow angle imaging in which part of the object is zoomed in is performed, the whole of the screen is dominated by a certain chromatic color, and it is difficult to automatically adjust the white balance. Meanwhile, as shown in the lowest resolution image 3002 in FIG. 3, when wide angle imaging is performed, there are various objects in the screen and therefore the whole of the screen is not dominated by a certain chromatic color. Therefore, when the high resolution image and the low resolution image are captured, there are often the cases where the white balance is different between the two images.

In this case, even when the band limiting filter related to reduction processing is adjusted, the image quality of the reduced image cannot be similar to the image quality of the actually captured image.

Therefore, the color correction unit 1002, according to the following Expression 2, corrects transforms a pixel value (R, G, B)t of the reduced image It outputted by the reduction processing unit 111 into a pixel value (R, G, B)c of a corrected reduced image Ic, corrects the difference in color feature, and matches the color feature of the reduced image and the color feature of the actually captured image.

[Math. 2]

$$\begin{pmatrix} R \\ G \\ B \end{pmatrix}_c = \begin{pmatrix} m_{11} & m_{12} & m_{13} \\ m_{21} & m_{22} & m_{23} \\ m_{31} & m_{32} & m_{33} \end{pmatrix} \begin{pmatrix} R \\ G \\ B \end{pmatrix}_t \quad \text{(Expression 2)}$$

$$\Leftrightarrow C = MT$$

Here, matrix M obtains many pairs of column C and row T, and is set in advance in analytical analysis. For example, in the case of FIG. 3, the useful image of the ⅛ reduced image of the highest resolution image 3001 is the lowest resolution image 3002. The lowest resolution image 3002 corresponds to column C. Meanwhile, matrix T corresponds to the ⅛ reduced image obtained by performing ⅛ reduction processing on the highest resolution image 3001. The same object is imaged at magnification of one time and at magnification of eight times, and the captured images are determined as the lowest resolution image 3002 and the highest resolution image 3001, respectively. Imaging of the object which includes colors different in color phase, chroma, and luminosity is appropriate for obtaining color feature. Usually, a color chart for obtaining the color feature is used.

The color correction unit 1002 calculates the corrected reduced image Ic by multiplying the reduced image It that is an output of the reduction processing unit 111 by the color correction, and outputs Ic to the allowable error determination unit 112. The color correction unit 1002 passes column M that is the color correction information to the image filter color correction information providing unit 1003.

The image filter color correction information providing unit 1003, as similarly to the image filter providing unit 103, provides the band limiting filter to the image processing unit 1004, and provides column M as the color correction information to the image processing unit 1004.

The image processing unit 1004, as similarly to the image processing unit 108, performs reduction processing and performs color correction processing, as similarly to the color correction unit 1002.

It should be noted that the above described Expression 2 is an example of a color correction method. One or more exemplary embodiments or features disclosed herein limit the color correction method, and any of the color correction methods can be used. For example, not only a format of performing operation such as Expression 2 but also a method for referring to the color correction information set in advance in a table reference format can be used.

As described above, the digital specimen manufacturing device 1000 according to Embodiment 2 generates the color correction information and corrects the difference in color feature between the reduced image of the high resolution image and the low resolution image. With this, the digital specimen manufacturing device 1000 can correct the difference in color feature between when the low resolution image is captured and when the high resolution image is captured, and equalize the image quality of the image generated by image processing with the image quality of the actually captured image. In other words, the digital specimen manufacturing device 1000 corrects the difference in color feature of the captured images, and generates the medium image obtained by changing the reference position and the magnification of the image. Therefore, since the digital specimen manufacturing device 1000 can cover not only image reduction processing but also matching of color feature, it is possible to reduce the number of captured image.

Embodiment 3

In Embodiment 2, a digital specimen manufacturing server will be described which includes a digital specimen manufacturing device capable of performing reduction processing on a captured image and freely changing zoom and pan in image processing, and maintaining the image quality at a certain standard. Especially, the digital specimen manufacturing server does not have to be installed at the same place as that of an imaging device, a display device, and an image server.

Figure 13:
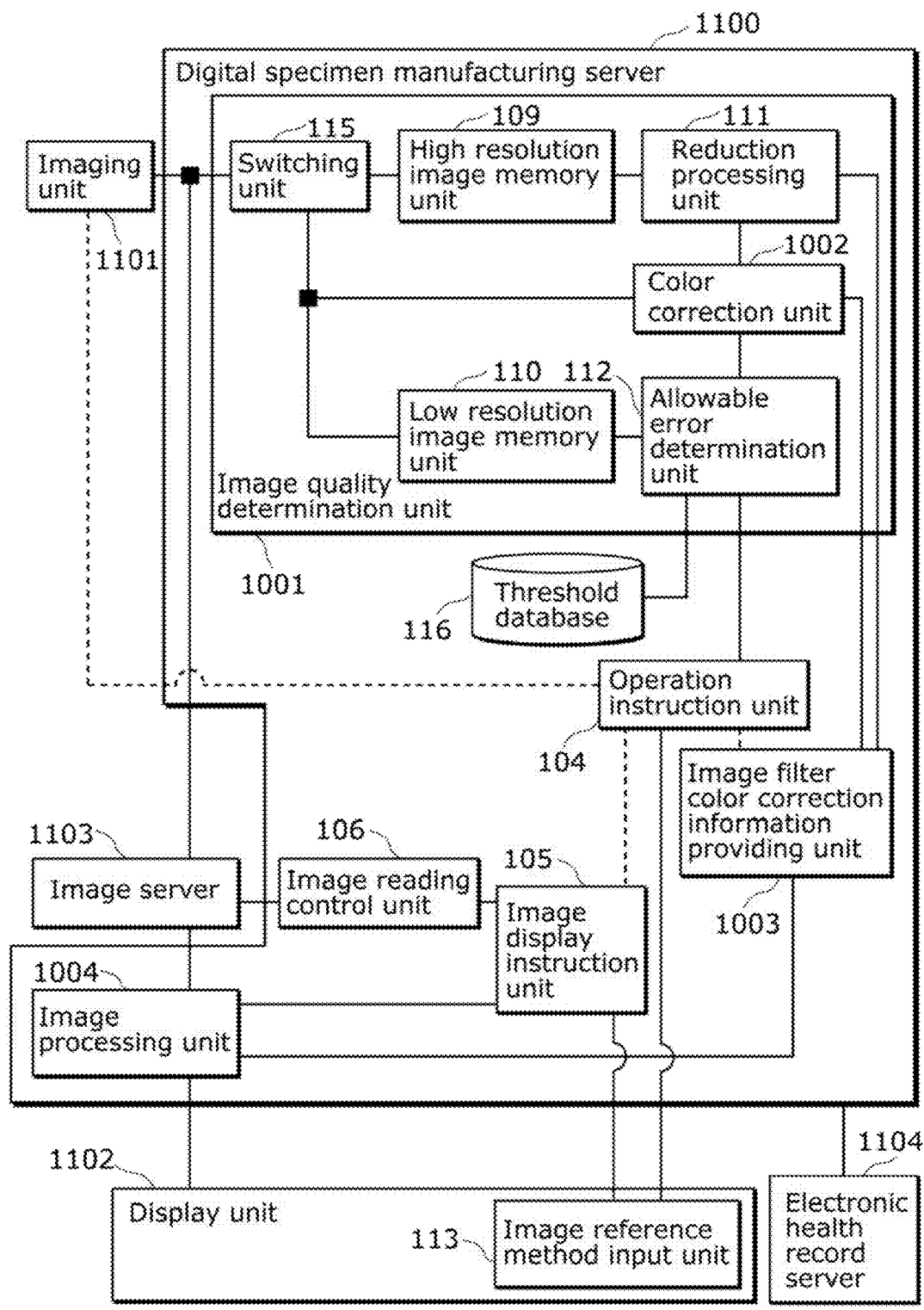
FIG. 13 is a block diagram showing a functional configuration of a digital specimen manufacturing server according to Embodiment 3.

FIG. 13 is a block diagram showing a functional configuration of a digital specimen manufacturing server 1100 according to Embodiment 3. It should be noted that the same reference signs will be assigned to the structural elements identical to those of the digital specimen manufacturing device 1000 according to Embodiment 2, and a detailed description thereof will be omitted.

The digital specimen manufacturing server 1100 includes the image quality determination unit 1001, the image filter color correction information providing unit 1003, the image processing unit 1004, the operation instruction unit 104, the image display instruction unit 105, and the image reading control unit 106 that are included in the digital specimen manufacturing device 100 according to Embodiment 3.

The digital specimen manufacturing server 1100 obtains, from the imaging device 1101 via a network, captured images such as the low resolution image and the high resolution image, and instructs the imaging device 1101 to recapture the low resolution image via a network. Moreover, the digital specimen manufacturing server 1100 is connected to an image server 1103 via a network, and transmits the image coordinates of the reference region to the image server. Moreover, an output of the image processing unit 108 is transmitted to a display device 1102 via a network.

The imaging device 1101 receives an operation instruction via a network from the operation instruction unit 104. However, since the digital specimen manufacturing server 1100 is connected to various imaging devices via a network, the digital specimen manufacturing server 1100 needs to understand each of the imaging devices in terms of control items and input and output features. Therefore, before the start of the imaging operation, the digital specimen manufacturing server 1100 and the imaging device 1101 hold negotiations by exchanging necessary information.

Subsequently, in the imaging device 1101, the mechanism of pan and zoom described in FIG. 2 can be driven by electronic control, and is automatically controlled on receipt of the instruction from the operation instruction unit 104. If the specimen 2001 can be set on the stage 2005 included in the imaging device 1101, pan, zoom, imaging, and the like of the imaging device 1101 can be remotely controlled via a network by the digital specimen manufacturing server 1100.

The display device 1102 transmits the image reference position and the magnification obtained from the image reference method input unit 113 to the image display instruction unit 105 via a network. Since various types of display devices are connected to the digital specimen manufacturing server 1100 via a network, the display device 1102, as similarly to the imaging device 1101, holds negotiations with each of the display devices by exchanging necessary information. The information to be transmitted by the display device 1102 to the digital specimen manufacturing server 1100 includes an image size, the number of gradations, and input and output features.

The digital specimen manufacturing server 1100 is connected via a network to an electronic health record server 1104, allowing the user to check the personal information of a patient. For example, when the doctor brings the test image of a patient out of the hospital to attend an academic conference, whether or not the patient gives an approval can be confirmed with a tag.

The digital specimen manufacturing server 1100, when transmitting an image to the display device 1102 out of hospital, refers to a tag showing the approval of the patient in the electronic health record server 1104. When the patient does not give an approval, the digital specimen manufacturing server 1100 forcibly stops the transmission of the image. Similarly, the digital specimen manufacturing server 1100, when freshly capturing an examination image, forcibly stops the imaging of the examination image when the doctor has not explained it to the patient in order not to start operation of the imaging device 1101.

As described above, when digitizing the specimen, the imaging device 1101, the display device 1102, the image server 1103, the digital specimen manufacturing server 1100 do not have to be set at the same location.

For example, a medical laboratory technician manufactures the specimen 2001 and sets it on the stage 2005, and a pathologist in a remote location captures, using the display device 1102, the low resolution image with magnification of one time and the highest resolution image with magnification of n times. The pathologist inputs the information necessary for setting a determination threshold of the allowable error determination unit 112, using the display device 1102. If the determination threshold in FIG. 9 is shared between the pathologist and the medical laboratory technician as the value of PSNR, the medical laboratory technician inputs the determination threshold and the pathologist can skip the setting of the determination threshold.

Moreover, by collaborating between the digital specimen manufacturing server 1100 and the electronic health record server 1104, it is possible to manufacture a digital specimen by association with the security management such as personal information.

The digital specimen manufacturing device 100, the digital specimen manufacturing device 1000, and the digital specimen manufacturing server 1100 according to one or exemplary embodiments have been described. However, one or more exemplary embodiments or features disclosed herein are no defined only by the one or more exemplary embodiments.

For example, in Embodiments 1 and 2, the digital specimen manufacturing devices 100 and 1000, as necessary structural elements, are required to include the reduction processing unit 111, the operation instruction unit 104, and the image processing unit 108. However, they do not have to include the other structural elements. Moreover, in Embodiment 3, the digital specimen manufacturing server 1100, as necessary structural elements, needs to include the reduction processing unit 111, the operation instruction unit 104, and the image processing unit 1004, but does not have to include the other structural elements.

Moreover, the digital specimen manufacturing device according the above described embodiments can be realized by a computer.

Figure 14:
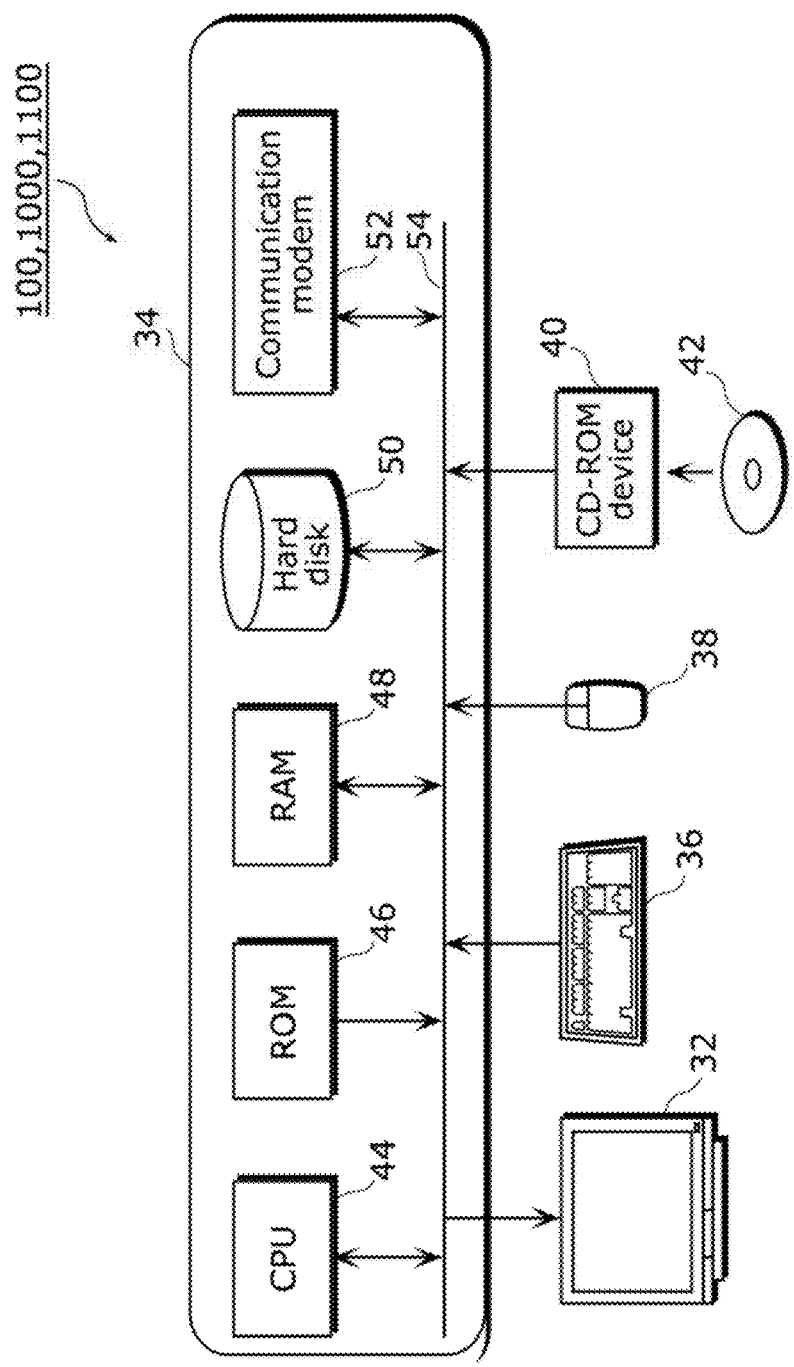
FIG. 14 is a block diagram showing a hardware configuration of a computer system realizing a digital specimen manufacturing device according to Embodiments 1 to 3.

FIG. 14 is a block diagram showing a hardware configuration of a computer system which realizes the digital specimen manufacturing device.

The digital specimen manufacturing device includes a computer 34, a keyboard 36 and a mouse 38 which provide an instruction to the computer 34, a display 32 which presents the information of an operation result and the like of the computer 34, a Compact Disc-Read Only Memory (CD-ROM) device and a communication modem (not illustrated) which read a program executed by the computer 34.

The program to be executed by the digital specimen manufacturing device is stored in a CD-ROM 42 that is a computer-readable recording medium, and is read by the CD-ROM device 40. Moreover, the program is read by the communication modem 52 via a network.

The computer 34 includes a central processing unit (CPU) 44, a read only memory (ROM) 46, a random access memory (RAM) 48, a hard disk 50, the communication modem 52, and a bus 54.

The CPU 44 executes a program read via the CD-ROM device 40 or the communication modem 52. The ROM 46 stores a program and data necessary for operating the computer 34. The RAM 48 stores data such as parameters when the program is executed. The hard disk 50 stores a program and data. The communication modem 52 communicates with other computers via a network. The bus 54 mutually connects the CPU 44, the ROM 46, the RAM 48, the hard disk 50, the communication modem 52, the display 32, the keyboard 36, the mouse 38, and the CD-ROM device 40.

Furthermore, a part or all of the constituent elements constituting the respective apparatuses may be configured from a single Large Scale Integration (LSI). The System LSI is a super-multi-function LSI manufactured by integrating constituent units on a chip, and is especially a computer system configured by including a microprocessor, a ROM, and a RAM. A computer program is stored in the RAM. The System LSI achieves its function through the microprocessor's operation according to the computer program.

Furthermore, a part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and so on. The IC card or the module may be included in the aforementioned super-multi-function LSI. The IC card or the module achieves its function through the microprocessor's operation according to the computer program. The IC card or the module may also be implemented to be tamper-resistant.

Moreover, one or more exemplary embodiments or features disclosed herein may be the methods as described above. Moreover, the methods may be a computer program to be realized by a computer or a digital signal including the computer program.

Furthermore, one or more exemplary embodiments or features disclosed herein may also be realized by the computer program or the digital signal in a non-transitory compute-readable recording medium such as flexible disc, a hard disk, a CD-Rom, an MO, a DVD, a DVD-ROM, a DVD-RAM, Blu-ray Disc (BD, a registered trademark), and a semiconductor memory. Furthermore, one or more exemplary embodiments or features disclosed herein may also include the digital signal stored in the non-transitory recording media.

Furthermore, one or more exemplary embodiments or features disclosed herein may be realized by the transmission of the aforementioned computer program or digital signal via a telecommunication line, a wireless or wired communication line, a network represented by the Internet, a data broadcast, and so on.

One or more exemplary embodiments or features disclosed herein may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another computer system is also made possible.

In other words, in the above described embodiments, each of the constituent elements man be configured by dedicated hardware, and may be realized by executing a software program suitable for each of the constituent elements. For example, the constituent elements may be realized by the execution by a program execution unit such as CPU or a processor of reading a software program recorded on a recording medium such as a hard disk or a semiconductor memory.

In other words, each of the constituent elements for the digital specimen manufacturing device shown in FIG. 1 or FIG. 12 or the digital specimen manufacturing server shown in FIG. 13 may be realized by software. The software realizing the digital specimen manufacturing device and the digital specimen manufacturing server is a program causing the computer to execute the following steps included in the digital specimen manufacturing method. In other words, a digital specimen manufacturing method is a method for manufacturing a digital specimen to be used to diagnose a disease or a medical condition, using a low resolution image and a high resolution image which are captured images of a specimen captured by an imaging unit, the low resolution image and the high resolution image having different resolutions, the digital specimen manufacturing method comprising: generating a reduced image of the high resolution image by reducing the high resolution image captured at a first magnification into an image of a second magnification which is an imaging magnification of the low resolution image; obtaining information indicating whether or not a difference between the reduced image and the low resolution image is within an allowable error range, and to instruct the imaging unit to update the second magnification and recapture the low resolution image at the updated second magnification when the information indicates that the difference is not within the allowable error range, the updated second magnification having a value greater than the second magnification and smaller than the first magnification; and obtaining a third magnification, and outputting an image of the digital specimen by performing reduction processing to change the high resolution image into an image of the third magnification, the third magnification being an image magnification greater than the updated second magnification and smaller than the first magnification and being an imaging magnification of the digital specimen.

Furthermore, the above described Embodiments 1 to 3 may be combined.

The disclosed embodiments are exemplary and non-limiting from all points.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the digital specimen manufacturing device according to each of the embodiments is a program described below.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

One or more exemplary embodiments or features disclosed herein can reduce as much as possible the imaging of specimen requiring much time, and allow a user to observe the specimen from a free viewpoint anytime and anywhere. Therefore, it is possible to determine the disease name and the medical condition, and contribute to increasing efficiency and quality of diagnosis that significantly influences the determination of medical treatment.

The invention claimed is:

1. A digital specimen manufacturing device which manufactures a digital specimen stored in a non-transitory computer readable memory and to be used to diagnose a disease or a medical condition, using a high resolution image and a low resolution image which are captured images of a physical specimen captured at a first magnification and a second magnification, respectively, by an imaging unit, the low resolution image and the high resolution image having different resolutions, and the first magnification being higher than the second magnification, the digital specimen manufacturing device comprising a microprocessor programmed to perform at least the following:

generating a reduced image of the high resolution image by reducing the high resolution image captured at the first magnification into an image at the second magnification which is an imaging magnification of the low resolution image;

determining whether or not a difference between the generated reduced image and the captured low resolution image is within an allowable error range:

when the difference is determined not to be within the allowable error range, performing a recapture process including:

increasing the second magnification and instructing the imaging unit to capture an updated captured image of the physical specimen at the updated second magnification, the updated second magnification having a value greater than the second magnification at which the low resolution image has been captured and any previous updated captured image and smaller than the first magnification at which the high resolution image has been captured, generating an updated reduced image of the high resolution image by reducing the high resolution image captured at the first magnification into an image at the updated second magnification which is an imaging magnification of the updated captured image, determining whether or not a difference between the updated reduced image and the updated captured image is within the allowable error range, and when the difference between the updated reduced image and the updated captured image is determined not to be within the allowable error range, repeatedly performing the recapture process with progressively increased magnifications until the difference between the updated reduced image and the updated captured image is within the allowable error range, such that one or more updated captured images are captured; and storing, in the non-transitory computer readable memory as the digital specimen, the low resolution image, the high resolution image, and, if the recapture process has been performed, at least one updated captured image generated in the recapture process.

2. The digital specimen manufacturing device according to claim 1, wherein the microprocessor is further programmed to:
determine whether or not the difference is within the allowable error range by comparing (i) the difference between the reduced image and the low resolution image with (ii) a determination threshold,
obtain, by an input from outside, information indicating whether or not the difference is within the allowable error range, and
obtain, as the determination threshold, a difference between the reduced image and the low resolution image when the obtained information indicates that the difference is within the allowable error range.

3. The digital specimen manufacturing device according to claim 1,
wherein the microprocessor calculates a peak signal-to-noise ratio (PSNR) as a difference between the reduced image and the low resolution image, and determines whether or not the difference is within an allowable error range by comparing the calculated PSNR with a determination threshold.

4. The digital specimen manufacturing device according to claim 1,
wherein the microprocessor generates the reduced image by reducing, using a band limiting filter, the high resolution image into the image at the second magnification, when the obtained information indicates that the difference is within the allowable error range,
wherein the microprocessor generates an image of the digital specimen by performing reduction processing on the high resolution image using the provided band limiting filter.

5. The digital specimen manufacturing device according to claim 1, wherein the microprocessor is further programmed to function at least as a color correction unit that corrects a difference in color feature between the reduced image and the low resolution image.

6. The digital specimen manufacturing device according to claim 5,
wherein the color correction unit generates color correction information for correcting the difference in color feature, from a color feature of the imaging unit at a time of capturing the low resolution image and a color feature of the imaging unit at a time of capturing the high resolution image.

7. A digital specimen manufacturing server comprising:
the digital specimen manufacturing device according to claim 1,
wherein the digital specimen manufacturing device obtains, via a network, a low resolution image and a high resolution image which are captured by an imaging device, instructs the imaging device to recapture the low resolution via a network, and outputs an image of a digital specimen via a network.

8. A digital specimen manufacturing method for manufacturing, with a microprocessor, a digital specimen stored in a non-transitory computer readable memory and to be used to diagnose a disease or a medical condition, using a high resolution image and a low resolution image which are captured images of a physical specimen captured at a first magnification and a second magnification, respectively, by an imaging unit, the low resolution image and the high resolution image having different resolutions, and the first magnification being higher than the second magnification, the method comprising:
generating a reduced image of the high resolution image by reducing the high resolution image captured at the first magnification into an image at the second magnification which is an imaging magnification of the low resolution image;
determining whether or not a difference between the generated reduced image and the captured low resolution image is within an allowable error range:
when the difference is determined not to be within the allowable error range, performing a recapture process including:
increasing the second magnification and instructing the imaging unit to capture an updated captured image of the physical specimen at the updated second magnification, the updated second magnification having a value greater than the second magnification at which the low resolution image has been captured and any previous updated captured image and smaller than the first magnification at which the high resolution image has been captured,
generating an updated reduced image of the high resolution image by reducing the high resolution image captured at the first magnification into an image at the updated second magnification which is an imaging magnification of the updated captured image,
determining whether or not a difference between the updated reduced image and the updated captured image is within the allowable error range, and
when the difference between the updated reduced image and the updated captured image is determined not to be within the allowable error range, repeatedly performing the recapture process with progressively increased magnifications until the difference between the updated reduced image and the updated captured image is within the allowable error range, such that one or more updated captured images are captured; and
storing, in the non-transitory computer readable memory as the digital specimen, the low resolution image, the high resolution image, and, if the recapture process has been performed, at least one updated captured image generated in the recapture process.

9. A non-transitory computer-readable recording medium having recorded thereon a program for causing a computer to execute the digital specimen manufacturing method according to claim 8.

* * * * *